US006998038B2

(12) United States Patent
Howard

(10) Patent No.: US 6,998,038 B2
(45) Date of Patent: Feb. 14, 2006

(54) STORMWATER TREATMENT SYSTEM

(75) Inventor: Robert Howard, Homer, AK (US)

(73) Assignee: CDS Technologies, Inc., Morgan Hill, CA (US)

( * ) Notice: Subject to any disclaimer, the term of this patent is extended or adjusted under 35 U.S.C. 154(b) by 0 days.

(21) Appl. No.: 10/901,905

(22) Filed: Jul. 28, 2004

(65) Prior Publication Data

US 2005/0040113 A1 Feb. 24, 2005

Related U.S. Application Data

(60) Provisional application No. 60/490,742, filed on Jul. 28, 2003.

(51) Int. Cl.
C02F 1/28 (2006.01)
(52) U.S. Cl. .............. 210/111; 210/125; 210/232; 210/250; 210/265; 210/282; 210/289; 210/291; 210/302; 210/317; 210/458; 210/502.1
(58) Field of Classification Search .......... 210/109, 210/111, 123, 125, 155, 162, 163, 282, 289, 210/291, 302, 306, 311, 317, 323.2, 458, 210/744, 804, 99, 232, 249, 250, 265, 502.1; 404/4, 5
See application file for complete search history.

(56) References Cited

U.S. PATENT DOCUMENTS

| 556,725 A | 3/1896 | Farwell |
| 887,069 A | 5/1908 | Cotter |
| 1,371,110 A | 3/1921 | Pelphrey |
| 2,609,932 A | 9/1952 | Fricke |
| 3,027,910 A * | 4/1962 | Oliver ............. 137/397 |
| 3,314,546 A | 4/1967 | Briggs et al. |
| 4,427,542 A | 1/1984 | Glover |
| 4,643,836 A | 2/1987 | Schmid |
| 4,997,561 A * | 3/1991 | Schutz ............. 210/232 |
| 5,133,619 A | 7/1992 | Murfae et al. |
| 5,316,589 A | 5/1994 | Krieger, Jr. |

(Continued)

FOREIGN PATENT DOCUMENTS

EP   0 900 175 B1   4/2002

OTHER PUBLICATIONS

Absorbent W marketing material: Pillows and socks, on or before 2004, 2 pages.

(Continued)

Primary Examiner—Matthew O. Savage
(74) Attorney, Agent, or Firm—Townsend and Townsend and Crew LLP

(57) ABSTRACT

A system for removing material from a flowing liquid, where the system includes one or more cartridges, where each cartridge has an outer permeable wall and an inner permeable wall that form a media region between the walls, where a media is disposed within at least part of the media region to remove at least a portion of the material from the flowing liquid, the cartridge also having an inner cartridge lumen in communication with the inner permeable wall, and a cartridge outlet in communication with the inner cartridge lumen; a cartridge chamber having a treatment region that houses the one or more cartridges, where the cartridge chamber also includes a chamber inlet to accept the flowing liquid, and a chamber outlet to discharge treated liquid; and an actuatable valve positioned outside the one or more cartridges, where the valve controls a flow rate of the flowing liquid within the treatment region by actuating in response to a change in a level of the liquid in the treatment region.

26 Claims, 20 Drawing Sheets

U.S. PATENT DOCUMENTS

| | | | |
|---|---|---|---|
| 5,322,629 | A | 6/1994 | Stewart |
| 5,330,651 | A | 7/1994 | Robertson et al. |
| 5,458,769 | A | 10/1995 | Johannessen |
| 5,573,349 | A | 11/1996 | Paoluccio |
| 5,624,552 | A | 4/1997 | Vales et al. |
| 5,624,576 | A | 4/1997 | Lenhart et al. |
| 5,632,889 | A | 5/1997 | Tharp |
| 5,707,527 | A | 1/1998 | Knutson et al. |
| 5,770,080 | A | 6/1998 | Malone |
| 5,788,848 | A | 8/1998 | Blanche et al. |
| 5,954,952 | A | 9/1999 | Strawser, Sr. |
| 6,027,639 | A * | 2/2000 | Lenhart et al. ............ 210/108 |
| 6,059,964 | A | 5/2000 | Strawser, Sr. |
| 6,517,724 | B1 | 2/2003 | Malone |
| 6,533,941 | B1 | 3/2003 | Butler |
| 6,649,048 | B1 | 11/2003 | de Ridder et al. |
| 2003/0094407 | A1 | 5/2003 | de Ridder et al. |
| 2004/0112807 | A1 | 6/2004 | Aberle et al. |

OTHER PUBLICATIONS

Aqua Treatment Systems, Inc. brochure entitled: "Small-Scale Water Treatment Systems", 1996, 14 pages.
Aqua Treatment Systems, Inc. brochure entitled: "So, who gets the last fish?", 1995, 14 pages.
Aqua Treatment Systems, Inc. document entitled: "90 Gallon Filter/Oil-Water Separator", 1998, 1 page.
Aqua Treatment Systems, Inc. document entitled: "Floor Mounted Catch Basin Insert with False Bottom", 2001, 1 page.
Aqua Treatment Systems, Inc. document entitled: "Gullywasher Brand—Radial Flow Filter Cartridge", 2000, 1 page.
Aqua Treatment Systems, Inc. document entitled: "Gullywasher Brand—Filter Baffle Frame and Cartridges", 2002, 1 page.
Aqua Treatment Systems, Inc. document entitled: "Gullywasher Brand—Radial Flow Stormwater Filter", 2000, 12 pages.
Aqua Treatment Systems, Inc. document entitled: "Gullywasher Brand—Parallel Stormwater Filter Baffle", 2002, 3 pages.
Aqua Treatment Systems, Inc. document entitled: "Gullywasher Brand—Series Stormwater Filter Baffle", 2002, 2 pages.
Aqua Treatment Systems, Inc. document entitled: "Gullywasher Tee Section Filters", Apr. 1999, 1 page.
Aqua Treatment Systems, Inc. document entitled: "Gullywasher", 1998, 9 pages.
Aqua Treatment Systems, Inc. document entitled: "Radial Flow Perlite Stormwater Filter", 1999, 2 pages.
Aqua Treatment Systems, Inc. document entitled: "Sediment Trap/Oil-Water Separator Trench Drain Conversion", 1999, 1 page.
Aqua Treatment Systems, Inc. document entitled: "Spill Mate Small Scale Oil-Water Separator", 1998, 1 page.
Aqua Treatment Systems, Inc. document entitled: "Stainless Steel Sediment Box", 2001, 1 page.
Aqua Treatment Systems, Inc. document entitled: "Trench Drain Filter Baskets", 1999, 1 page.
Aqua Treatment Systems, Inc. document entitled: "We have spill kits!", 1998, 1 page.
Aqua Treatment Systems, Inc. document entitled: "Wire Gutter for Curb Inlets", 2001, 1 page.
Brueske, Christopher et al. "Technology Review: Ultra-Urban Stormwater Treatment Technologies", Sep. 1, 2000, pp. 1-54.
CDS Technologies, Inc. document entitled: "Complete line of structural storm water BMPs", Trade Show materials from , on or before 2004, 8 pages.
CDS Technologies, Inc. marketing material entitled: "You asked for a compact solution . . . and we've delivered it", on or before 2004, 1 page.
Coffey, Laura "Portland firm turns over a new leaf" Daily Journal of Commerce, Seattle, Washington, Nov. 19, 1996, 2 pages.
Fabco Industries, Inc. document entitled: "StormCube Stormwater Filtration System", on or before 2004, 2.pages.
Haz-Mat Response Technologies, Inc. "Rubberizer ® Filtration Filter Media Performance Report", 1996, 9 pages.
Lenhart, James H. "Stormwater filters maintain water quality without sacrificing valuable urban land" APWA Reporter, Feb. 1999, pp. 4-5.
NJOAT website printout, "Verification Process: Stormwater Management", Jun. 11, 2002, 3 pages.
SpillTech marketing material: "Spill Response Products", on or before 2004, 2 pages.
Stormwater Management, Inc. document entitled: "StormScreen™" , 2004, 2 pages.
Stormwater Management, Inc. document entitled: "StormScrubber™ A Water Quality Treatment Device", 2004, 14 pages.
Vortechnics website printout: Vortechs System Features, printed 2004, 5 pages.
Vortechnics website printout: VortFilter Product Information, printed 2004, 2 pages.
Vortechnics website printout: VortFilter Specifications, Section 02721 Stormwater Filtration System; printed 2004, pp. 1-4.
Vortechnics website printout: VortFilter Technical Bulletin 1, printed 2004, 2 pages.
Vortechnics website printout: VortFilter Technical Design Manual, printed 2004, 15 pages.
Wigginton, Bryan O. et al. "Testing of Sediment Loads on *StormFilter*™ Pleated Fabric Inserts and CSF® Leaf Media" Stormwater Management, Feb. 16, 1998, 5 pages.

* cited by examiner

STORMWATER TREATMENT SYSTEM

CROSS-REFERENCES TO RELATED APPLICATIONS

This application claims the benefit of U.S. Provisional Application No. 60/490,742, filed Jul. 28, 2003, entitled "WATER TREATMENT SYSTEM" the entire contents of which are herein incorporated by this reference.

FIELD OF THE INVENTION

The inventions described herein relate to systems, apparatus and methods for removing some or all of a material from a flowing fluid, storm water treatment, water treatment and purification, and pollution control.

BACKGROUND OF THE INVENTION

Storm water, as it falls to the ground, forms runoff and often solubilizes pollutants, suspends sediments, and carries trash and debris, collectively referred to as materials, that have accumulated on surfaces, especially impermeable surfaces such as roadways. The runoff then flows onward to reach a receiving body of water such as a lake. By carrying, materials to the receiving body of water, over time, an accumulation of these materials will occur in the receiving body, potentially harming the environment. Thus, there is a need for human intervention to remove pollutants, trash and debris, and/or sediments from runoff to prevent or limit the amount of these materials from reaching receiving bodies of water. Ideally, such intervention would remove the materials from the runoff while allowing the runoff water to continue on to its receiving body of water. Moreover, such intervention should be automatic and require little supervision or maintenance, or at least rely mainly on scheduled maintenance.

The invention disclosed herein provides for these objects and more.

BRIEF SUMMARY OF THE INVENTION

The invention provides systems, apparatus, and methods for using the same for removing a material from a flowing liquid, such as storm water. The invention provides in one aspect a system for removing material from a flowing liquid. Some embodiments of the system include one or more cartridges, where each cartridge has an outer permeable wall and an inner permeable wall that form a media region between the walls. A media is disposed within at least part of the media region to remove at least a portion of the material from the flowing liquid. The cartridge may also include an inner cartridge lumen in fluid communication with the inner permeable wall, and a cartridge outlet in fluid communication with the inner cartridge lumen. The system also includes a cartridge chamber having a treatment region that houses the one or more cartridges. The cartridge chamber may also include a chamber inlet to accept the flowing liquid, and a chamber outlet to discharge treated liquid. They system may further include an actuatable valve positioned outside the one or more cartridges. The valve controls a flow rate of the flowing liquid within the treatment region by actuating in response to a change in a level of the liquid in the treatment region.

Some embodiments of the system include one or more cartridges, where each cartridge has an outer permeable wall and an inner permeable wall that form a media region between the walls. A media is disposed within at least part of the media region to remove at least a portion of the material from the flowing liquid, the cartridge also having an inner cartridge lumen in fluid communication with the inner permeable wall, and a cartridge outlet in fluid communication with the inner cartridge lumen. The system also includes a cartridge chamber for the one or more cartridges. The cartridge chamber may also include a chamber inlet and a chamber outlet. A conduit may provide fluid communication between the chamber outlet and the cartridge outlet, and the cartridge outlet may be attached to the conduit by a non-threaded coupling. The system may also include an actuatable valve positioned outside the one or more cartridges. The valve controls a flow rate of the flowing liquid within the system by actuating in response to a change in a level of the liquid in the cartridge chamber.

Some embodiments include having the valve being actuated to increase a flow of the liquid through the valve as the level of the liquid increases within the treatment region, having the level of the liquid being maintained about a selected level within the treatment region, having the cartridge be a plurality of cartridges, and further comprising a manifold in fluid communication with each of the plurality of cartridges and the valve, having the cartridge chamber is wholly or partly made of concrete, having the cartridge rest upon a floor of the cartridge chamber.

Some embodiments include one or more supports being in between the cartridge and the floor for elevating the cartridge above the floor, the cartridge outlet and the valve communicating through a manifold, including a coupling for connecting the cartridge outlet to the manifold, for example where the coupling is made wholly or partly from a flexible material and where the cartridge outlet is separable from the manifold or the coupling, and where the valve is a gate valve (e.g., a variable rate valve) where the cartridge is press-fit attached to the coupling or the manifold and/or attached to the coupling or the manifold using a non-threaded coupling, and/or where all of the manifold is removable from the cartridge chamber.

Some embodiments have the media being selected from the group consisting of compost, vermiculite, activated carbon, zeolite, perlite, ion exchange media, peat, and sand.

Some embodiments include having the cartridges further comprise a retainer connection boss or recess and the system further comprises a retainer for retaining the cartridge in or about a selected position within the cartridge chamber, having a cartridge chamber service entrance sized to permit entry of a person into the cartridge chamber (e.g., through a service entrance located on a top wall of the cartridge chamber) and the system further comprising a landing region beneath the service entrance, wherein the person, upon entry into the cartridge chamber, can occupy the landing region.

In some embodiments the flowing liquid is water (e.g., storm water) in some embodiments, the liquid is non-aqueous or the liquid comprises water and the material comprises a material component selected from the group consisting of sediment, fine suspended solids, algae, plant material, animal waste, pollutants, oil, agricultural by-products, herbicides, pesticides, trash, debris, heavy metals, copper, phosphates, and phosphorous.

In yet another aspect of the invention, the invention provides for a system for removing material from a flowing liquid. The system including one or more cartridges, the cartridge having an outer permeable wall, an inner permeable wall, the outer permeable wall and the inner permeable wall defining a media region therebetween, media disposed within some or all of the media region, the media being able to remove some or all of the material from the flowing liquid when the flowing liquid contacts the media, an inner cartridge lumen in communication with the inner permeable wall, and a cartridge outlet port in communication with the inner cartridge lumen; a cartridge chamber for chamber the cartridges, the chamber having a chamber inlet, a chamber outlet, the chamber outlet being in communication with the cartridge outlet via a conduit; a valve for regulating flow through the cartridge chamber, the valve being actuated in response to changes in a liquid level inside of the cartridge chamber; wherein the cartridge outlet is attached to the conduit through a non-threaded coupling.

Another aspect of the invention provides a method for removing a material from a flowing liquid comprising the steps of providing a system comprising a cartridge chamber having a chamber inlet and a chamber outlet, and one or more cartridges therein, the cartridge having an outer permeable wall, an inner permeable wall, the outer permeable wall and the inner permeable wall defining a media region therebetween, media disposed within some or all of the media region, the media being able to remove some or all of the material from the flowing liquid when the flowing liquid contacts the media, an inner cartridge lumen in communication with the inner permeable wall, and a cartridge outlet port in communication with the inner cartridge lumen; flowing the liquid containing the material through the system so that the flowing liquid flows through the cartridge and contacts the media, whereby some or all of the material binds to the media so that some or all of the material is removed from the flowing liquid once passed through the cartridge chamber.

Another aspect of the invention provides a method for changing cartridges in a cartridge chamber used for removing material from a flowing liquid comprising the steps of: providing a system comprising a cartridge chamber having a chamber inlet and a chamber outlet, and one or more cartridges therein, the cartridge having an outer permeable wall, an inner permeable wall, the outer permeable wall and the inner permeable wall defining a media region therebetween, media disposed within some or all of the media region, the media being able to remove some or all of the material from the flowing liquid when the flowing liquid contacts the media, an inner cartridge lumen in communication with the inner permeable wall, and a cartridge outlet port in communication with the inner cartridge lumen, the cartridge outlet port being in communication with the chamber outlet via a conduit, wherein the cartridge outlet is attached to the conduit by a non-threaded coupling; detaching the cartridge from the conduit; and, replacing the cartridge with a new cartridge by attaching the cartridge to the conduit with the non-threaded coupling.

Yet another aspect of the invention provides a method for changing cartridges in a cartridge chamber used for removing material from a flowing liquid comprising the steps of: providing a system comprising a cartridge chamber having a chamber inlet and a chamber outlet, and one or more cartridges therein, the cartridge having an outer permeable wall, an inner permeable wall, the outer permeable wall and the inner permeable wall defining a media region therebetween, media disposed within some or all of the media region, the media being able to remove some or all of the material from the flowing liquid when the flowing liquid contacts the media, an inner cartridge lumen in communication with the inner permeable wall, and a cartridge outlet port in communication with the inner cartridge lumen, the cartridge outlet port being in communication with the chamber outlet via a conduit, wherein the cartridge outlet is attached to the conduit by a non-threaded coupling, wherein the cartridge chamber further comprises a valve for controlling the flow of the liquid through the cartridge chamber, the valve actuating in response to changes in a liquid level inside of the cartridge chamber outside of the cartridges so as to maintain the liquid level inside of the cartridge chamber about a selected level while liquid is flowing through the cartridge chamber; detaching the cartridge from the conduit; and, replacing the cartridge with a new cartridge by attaching the cartridge to the conduit with the non-threaded coupling.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

The invention provides systems, devices, and methods for using the same for treating flowing water, for example removing some or all of pollutants carried in storm water runoff. In general, the invention provides for a treatment system comprising a cartridge chamber having an inlet and an outlet, and one or more cartridges housed therein. The cartridges contain media that is suitable for removing one or more pollutants from storm water when contacted with the media. The treatment system further includes devices that work in concert to regulate the flow of liquid through the cartridge chamber so that the cartridges operate within selected flow rates to optimize pollutant removal efficiency, including, but not limited to, valves for regulating the flow of liquid through the cartridges, and diverters for diverting excess liquid flow to prevent release of retained pollutants from the cartridge chamber in the event of over-flow events.

General System

Figure 1:
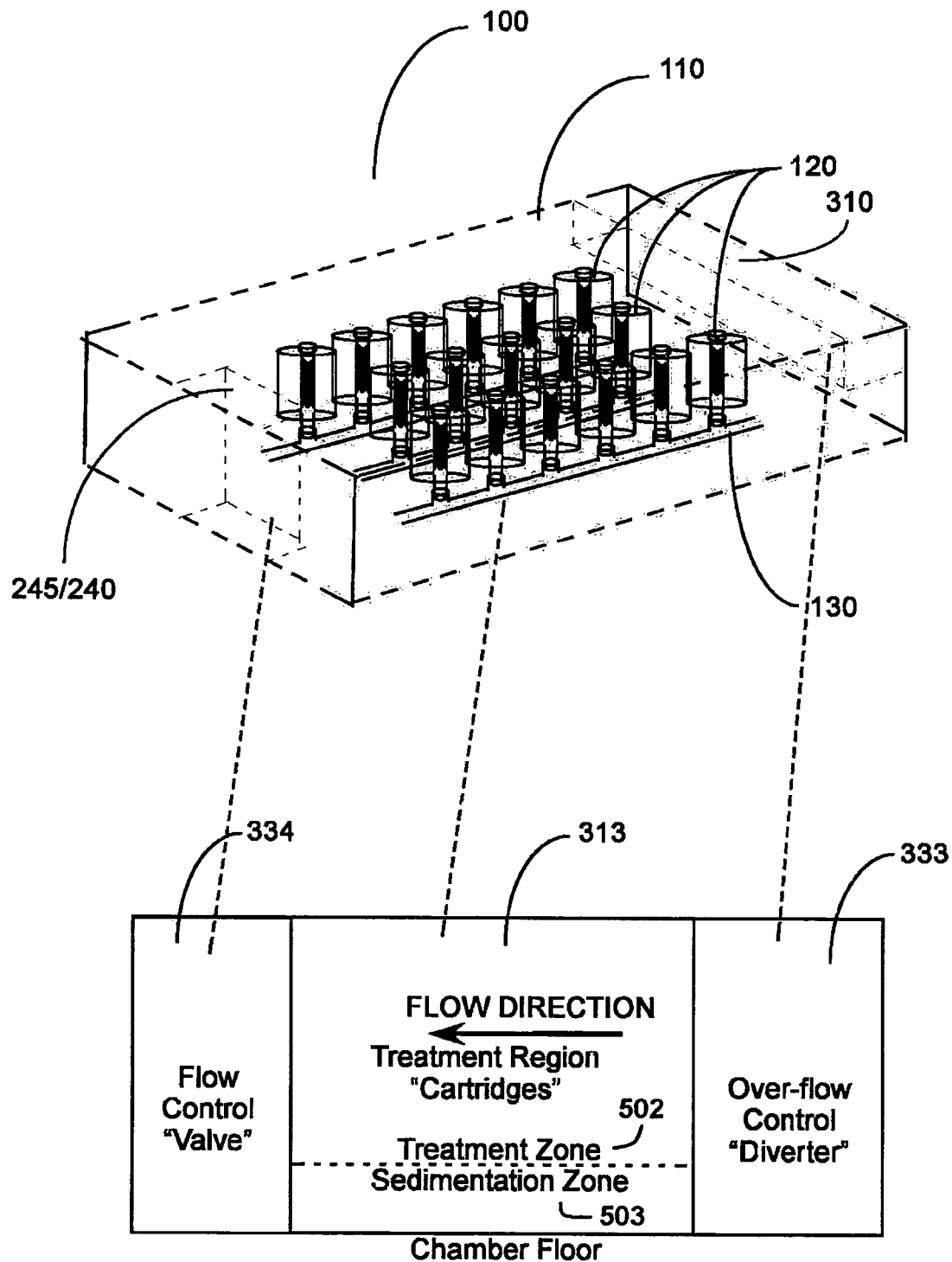
FIG. 1 depicts an array of cartridges arranged within a cartridge chamber.

FIG. 1 depicts a perspective-view of a system according to embodiments of the invention. Liquid treatment system 100 comprises cartridge chamber 110, which houses cartridges 120 attached to manifold 130. Beneath the perspective-view is an idealized side-view showing the three general regions of the cartridge chamber, an overflow control region 333, a treatment region 313, and a flow control region 334. Cartridge chamber 110 is further divided into flow control region, treatment region that comprises a sedimentation zone and a treatment zone, and a valve region, wherein a valve to regulate flow through the system is housed. In general, liquid flows into cartridge chamber 110 through an inlet, not shown. The liquid then flows towards and through cartridges 120 and on through manifold 130, which leads to an outlet, not shown. As the liquid flows through cartridge chamber 110, material, (e.g., pollutants and sediments) are removed from the flowing liquid. For example, as liquid carrying sediment enters the cartridge chamber, its velocity slows to permit sedimentation upon the floor of cartridge chamber 110. The flow of liquid out of cartridge chamber 110 may, for example, be regulated to cause a rise in liquid level within cartridge chamber 110 resulting in the creation of liquid head above cartridges 120. Treatment region 313 is further divided into a treatment zone 502, wherein liquid enters into cartridges 120 when the liquid is present in treatment zone 502, and sedimentation zone 503, wherein sediments suspended in inflowing liquid can settle and accumulate below cartridges 120, when supported above the floor of the cartridge chamber.

Cartridges and Manifolds

Figure 2A:
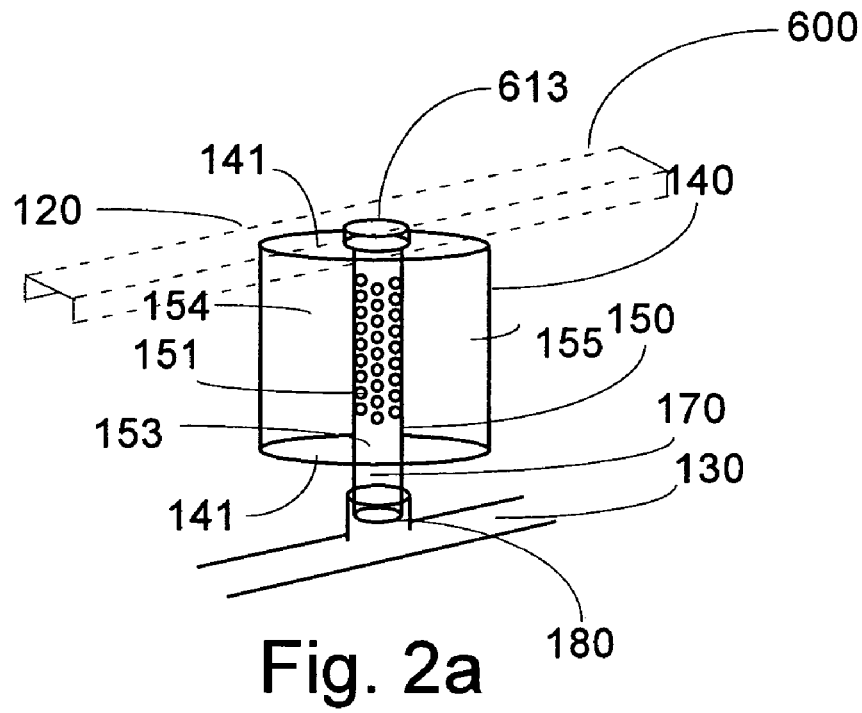
FIGS. 2a–d show various cartridge attachments to a manifold.

FIG. 2a shows a cartridge 120 having cartridge outer wall 140 and cartridge inner wall 150, having disposed therebetween, media region 154 having therein and media 155, and wherein inner wall 150 further defines cartridge lumen 153 that is in communication with cartridge outlet 170. Cartridge outlet 170 attaches to either directly to manifold 130 or indirectly through coupling 180. The coupling 180 may attach to either manifold 130, cartridge outlet 170, or both, and may be attached using a threaded coupling, or non-threaded coupling, which may include one or more hose-type clamps, a slip fit fitting, a bayonet-type fitting, compression fitting. In some embodiments, coupling 180 has a length long enough to permit elevation of cartridge 120 above the floor of the cartridge chamber so as to prevent accumulation of sediment against some or all of outer wall 140 by creating a sedimentation area disposed between the floor of the cartridge chamber and cartridge 120. In some embodiments, cartridge 120 may be disassembled to permit cleaning of the inner and outer cartridge walls and to permit exchange or reconditioning of media 155. Retainer boss or recess 613 provides for a point of attachment or contact for a retainer bar to restrict movement of cartridge 120 during operation. Retainer boss 613 may be placed on the portion of cartridge 120 opposite cartridge outlet 170.

On occasion, cartridges 120 may be removed from the system for servicing or replacement. In embodiments where the coupling is a slip-fit, press-fit, or compression type coupling, a coupling separator tool may be used to separate the coupling from the manifold, thus liberating cartridge 120. For example, a coupling separator tool may be a lever handle terminating in a bifurcation, wherein the distance between each prong is greater than that of the width or diameter of the coupling, so as to permit the bifurcation to slide past the coupling so that the lever handle may be articulated to cause a separating force to be applied between the coupling and either the manifold or the cartridge outlet, or both, resulting in the separation of the cartridge from the manifold.

Cartridge 120 may be fabricated from a variety of materials. For example, the outer and inner cartridge wall may be made from a permeable material, such as a porous material or a screen, plastic, polymer(s), and/or metal (e.g., aluminum, steel, stainless steel, etc.). Outer and inner walls 140 and 150 may be specially treated to minimize accumulation of material onto their surfaces. For example, outer wall 140 may be coated with a non-sticking material such as PTFE or Teflon, to prevent the sticking of sediments to the surface of outer wall 140. In other embodiments, a pre-filter sleeve, not shown, may be placed against outer wall 140 to provide additional treatment capacity to cartridge 120. Pre-filter sleeves may be made from foam (e.g., elastomeric foam) woven fabric, (e.g., fiberglass or a polymer). In use, pre-filters would be exchanged at in between cartridge exchanges to effectively prolong the life of the cartridge. This is especially useful in applications where fine suspended solids are found which do not readily sediment, yet are large enough to plug the interstitial spaces within the bed formed by the media. In this situation, the pre-filter would serve to trap such fine solids from the liquid prior to the liquid contacting the media in the bed. Pre-filters may also provide a treatment to the fluid different than the treatment provided by the media, thus creating a combination of treatments. Moreover, in some embodiments, media may be mixed media, wherein different media components are layered and/or mixed together within the media region of cartridge 120. Cartridges may further comprise ends 141 which server to space-apart outer and inner cartridge walls 140 and 150, and to close off the ends of the media space. Ends 141 may be made from wood, metal, plastic or a polymer, among other material compatible with the liquid to be treated. Ends 141 may further include one or more recesses for receiving the outer and/or inner cartridge wall edges, to retain and protect the edge of such walls from catching or snagging during movement or exchange of cartridges 120.

Cartridge 120 may further include outer shroud that, in some embodiments, further protects cartridge outer wall 140 from plugging by providing a longer fluid path for which fluid containing fine solids must travel. This longer path serves to reduce the turbulence of the fluid as it enters cartridge 120. The outer shroud may further provide for other benefits as described in U.S. Pat. No. 6,027,639, by Lenhart, et al., and U.S. Pat. No. 5,707,527, by Knutson, et al., both of which are herein incorporated by reference for all purposes, and the specific purposes disclosed therein and herein.

Figure 2B:
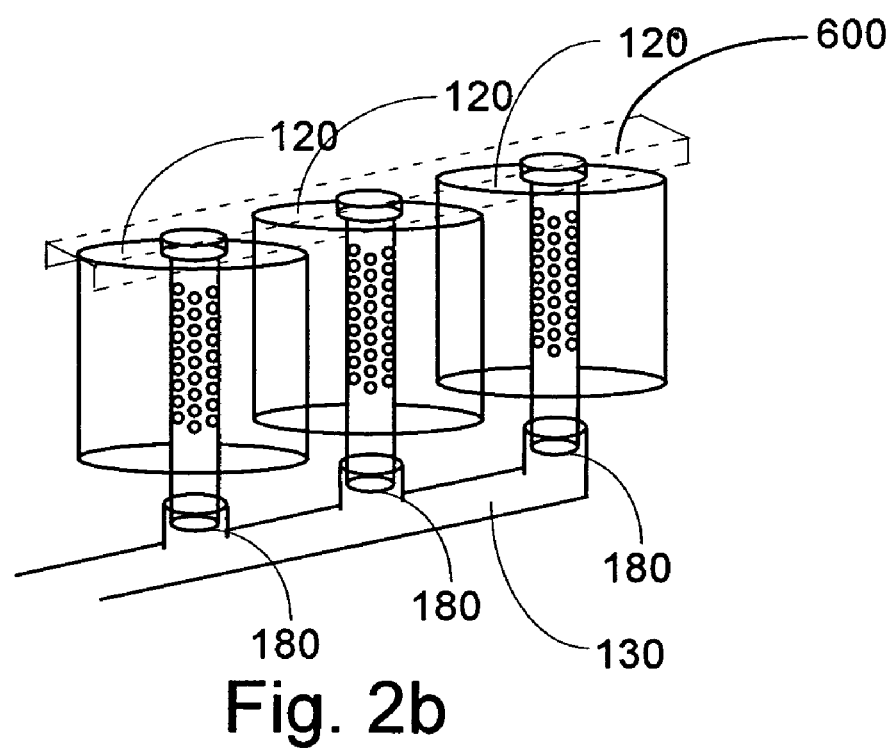
Figure 2C:
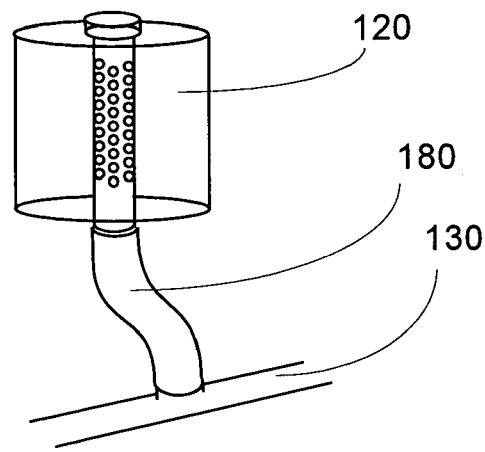
Figure 2D:
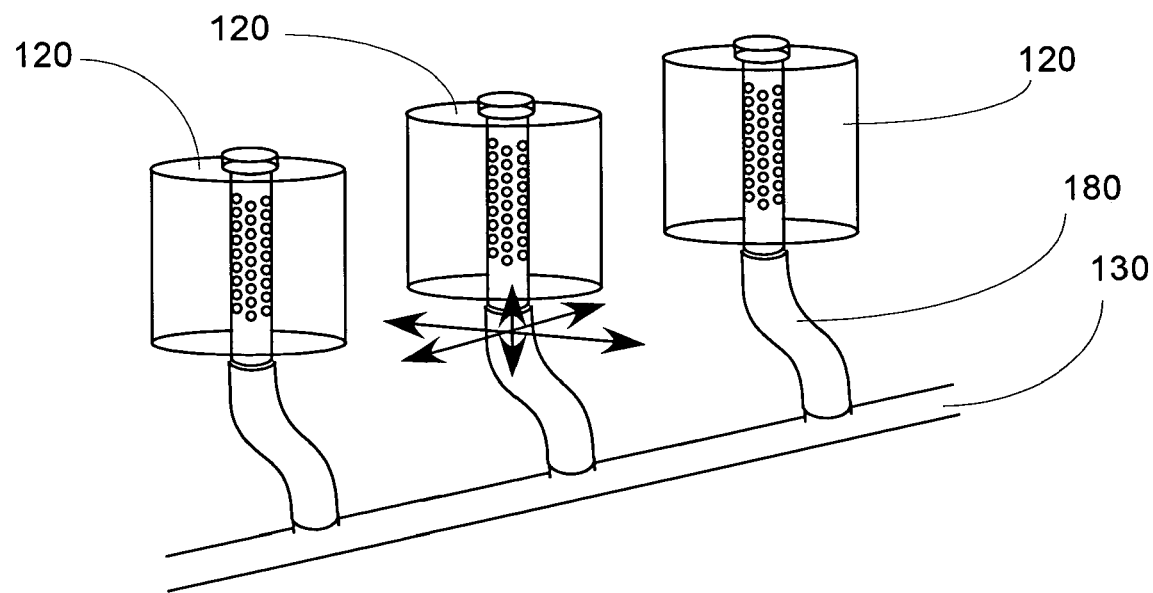

FIG. 2b depicts a linear array of cartridges 120 that are attached to manifold 130 via coupling 180. The plurality of cartridges 120 are held in position by retainer 600. FIG. 2c illustrates how coupling 180 (joining cartridge 120 to manifold 130) may be elongate. FIG. 2d illustrates how the coupling 180 may be flexible between cartridge 120 and manifold 130. When coupling 180 is flexible, it may be fashioned to permit movement of each cartridge 120 about its attachment to manifold 130 and also with respect to other cartridges 120. Some embodiments use a flexible hose that is press-fit or slip fitted into the cartridge outlet, to provide for ease of removal of cartridge 120 during servicing or exchange.

Figure 3:
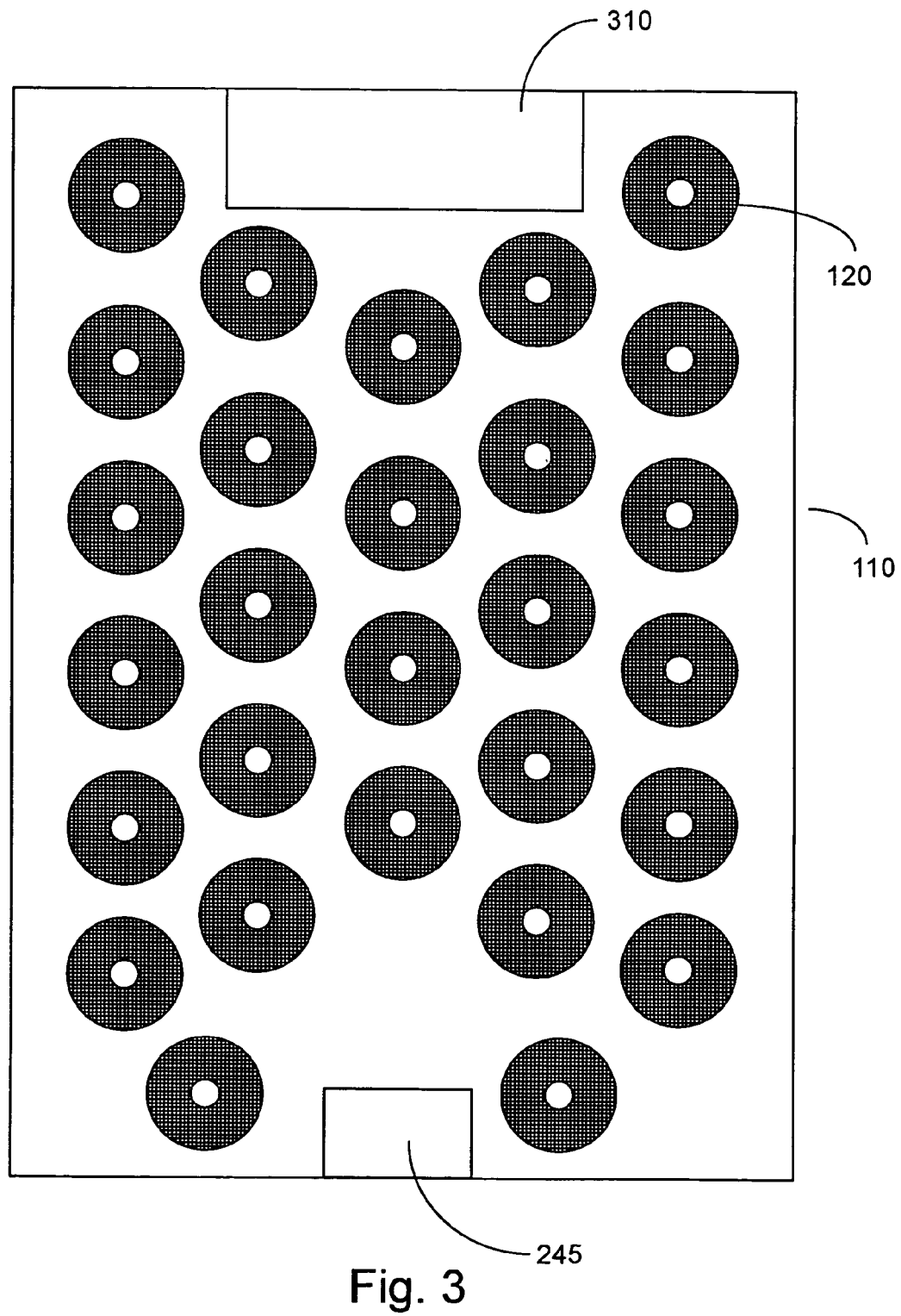
FIG. 3 depicts plan-view of embodiments of a treatment system.

FIG. 3 depicts a plan-view (i.e., bird's eye view) of the cartridge chamber 110 having therein a plurality of cartridges 120. Also shown is diverter 310, and valve housing 245 that houses a valve. Both the diverter and valve housing are further described below.

Valves and Valve Actuation

Figure 4:
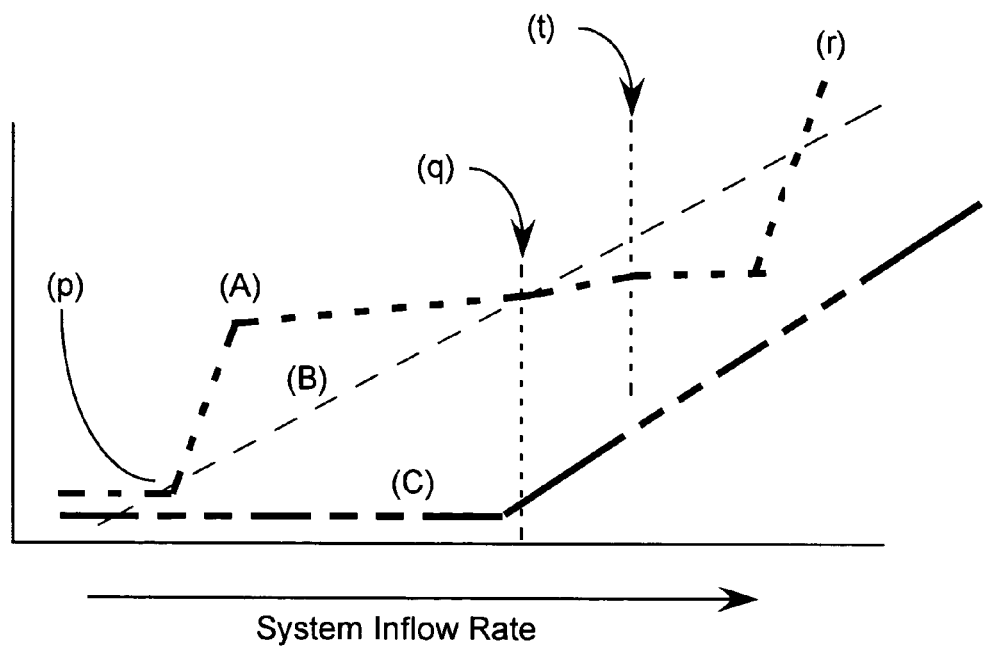
FIG. 4 depicts a graphical representation of system characteristics.

Embodiments of the system may include the use of a flow valve and diverter to control the level (e.g., depth) of liquid in the cartridge chamber as well as the flow rate of liquid passing through the chamber. Line A of the idealized graph shown in FIG. 4 plots the depth of liquid in a cartridge chamber as a function of the rate liquid is flowing into the chamber system (Line B). The graph also shows an overflow rate of liquid discharging from the system (Line C) as a function of the flow rate of liquid entering the system. Additional details about the interrelationships between the liquid depth, liquid inflow rate, and overflow discharge rate shown in FIG. 4 will be given below.

Figure 5:
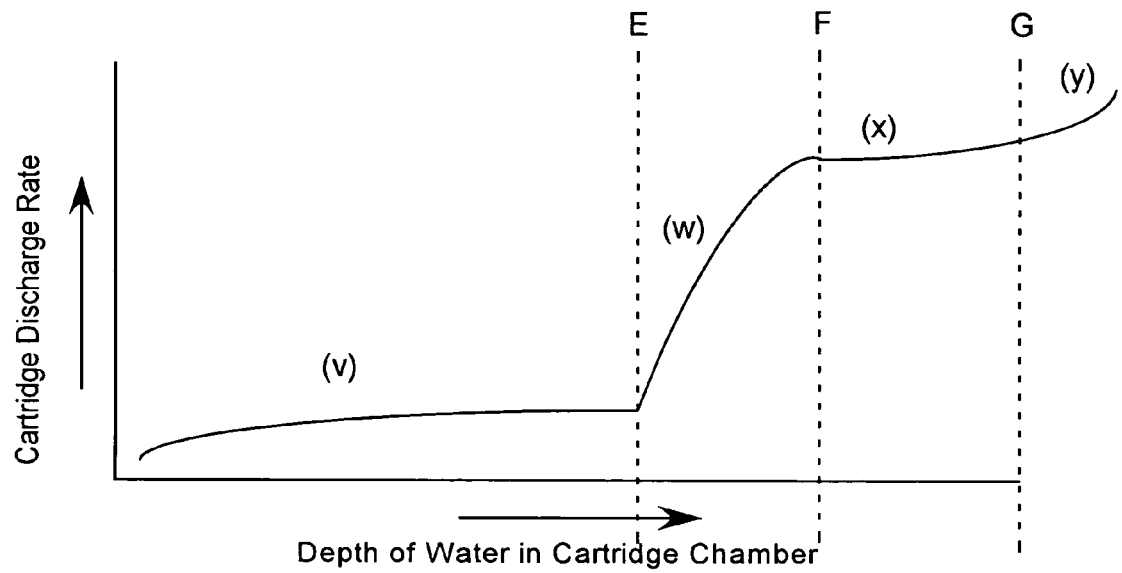
FIG. 5 depicts another graphical representation of system characteristics.

In operation, a valve may be used to regulate the depth of liquid in the cartridge chamber. Liquid to be treated flows through the cartridges, into the cartridge lumens, onward through the coupling and manifold towards the valve, wherein the valve controls the flow of liquid through the cartridges so as to substantially maintain the level of liquid collected in the cartridge chamber about a selected level within a range of system inflow rates. FIG. 5 provides an idealized graphical depiction of the relationship between the liquid discharge rate from the cartridge system, controlled at least in part by valve actuation, as a function of the liquid depth in the treatment region of the cartridge chamber. Region "(v)" of FIG. 5 is a region where the depth of liquid in the treatment region is low enough that the valve remains substantially closed. With the valve closed, liquid may accumulate in the cartridge chamber until the liquid level rises to a certain point (i.e., point "E"). When the liquid level rises to point "E", the valve may begin to open ("actuation"), to increase the flow of liquid from the treatment region through the cartridges and onward to the outlet. The valve opening may increase with rising liquid level throughout region "(w)", until the valve is fully open at point "F". After point "F" is reached, the liquid discharge rate through the open valve may increase slightly with increasing depth as shown by region "(x)". When the liquid level in the chamber reaches point "G" overflow liquid may discharge from the system, further increasing the discharge rate in region "(y)".

Figure 6:
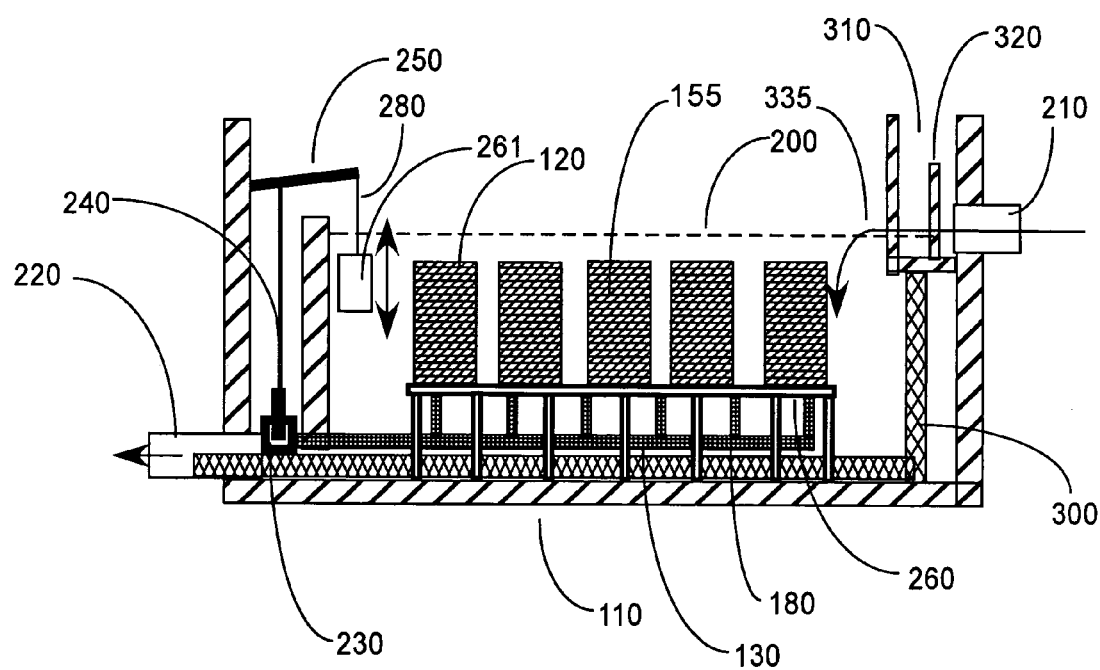
FIG. 6 depicts a cross-sectional view of embodiments of a treatment system.

FIG. 6 depicts an embodiment of a cartridge system in operation, shown in cross-sectional view. As shown, cartridge system 100 comprises cartridge chamber 110 having chamber inlet 210 and chamber outlet 220. Inside cartridge chamber 110 is cartridge 120, which is in communication with valve 230 through coupling 180 and manifold 130, wherein valve 230 is actuated by changes in fluid level 200 of treatment region 313 shown in FIG. 1. Valve 230 is actuated by valve shaft 240, which is connected to valve arm 250, as valve arm 250 changes position, as shown by the double arrow, in relation to changes in fluid level 200 that causes movement of float 261 which acts on valve arm 250 through float connecting shaft 280. As shown in the embodiment depicted in FIG. 6, as float 261 moves upward away from floor 110, valve arm 250 moves up to open valve 230, thus permitting increased amounts of liquid to flow through valve 230, which causes increased flow through media 155, thereby removing some or all material in a fluid flowed through the cartridge system.

Figure 7:
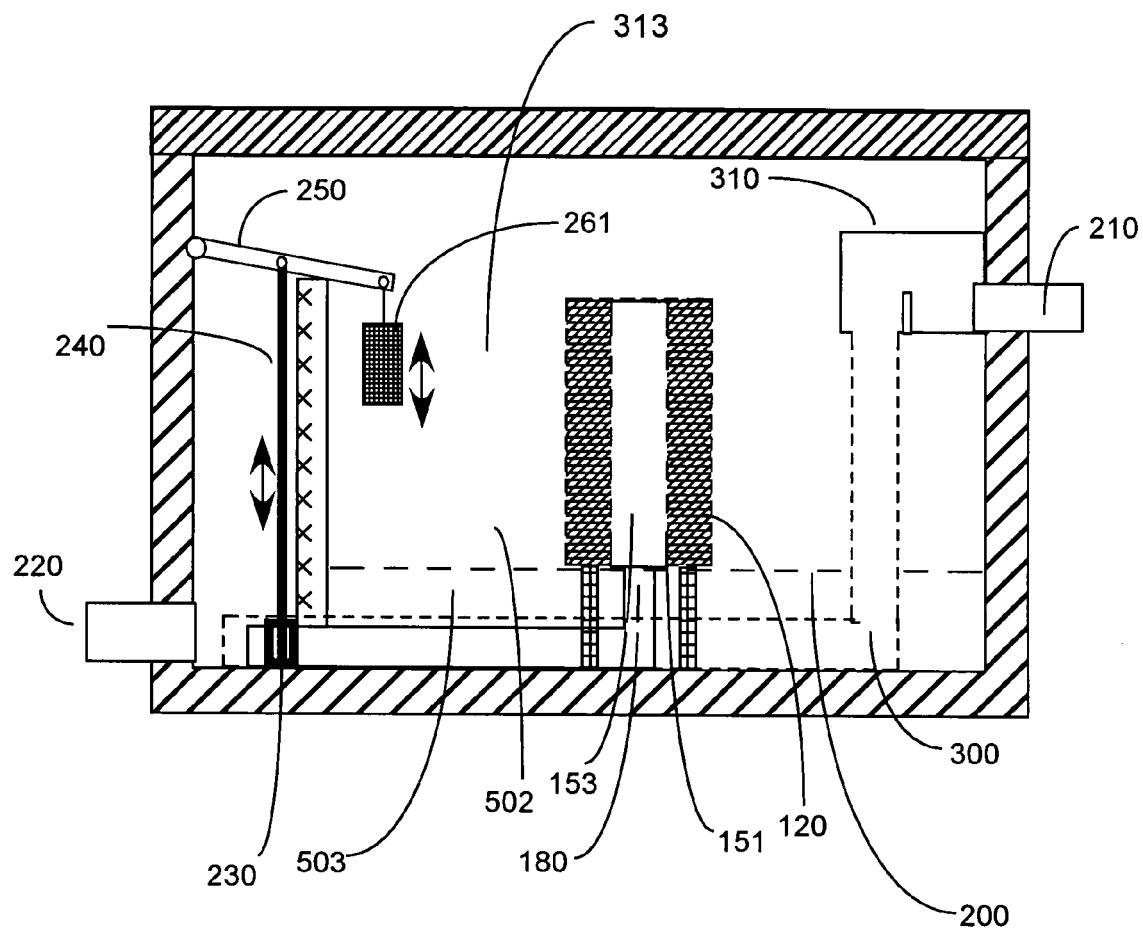
FIG. 7 depicts embodiments of a treatment system operating in a low-flow state.

FIG. 7 depicts valve 230 in a closed state in response to liquid level 200 being below the point of actuation for valve 230. In some embodiments, a residual amount of fluid remains in treatment region 313 in FIG. 1, so as to keep sedimentation zone 503 hydrated to minimize the caking of sediments. In some embodiments, a drain port permits the draining of treatment zone 502 liquid from the cartridge chamber so that the liquid level inside the treatment region 313 is maintained slightly above the sedimentation zone 503.

Figure 8A:
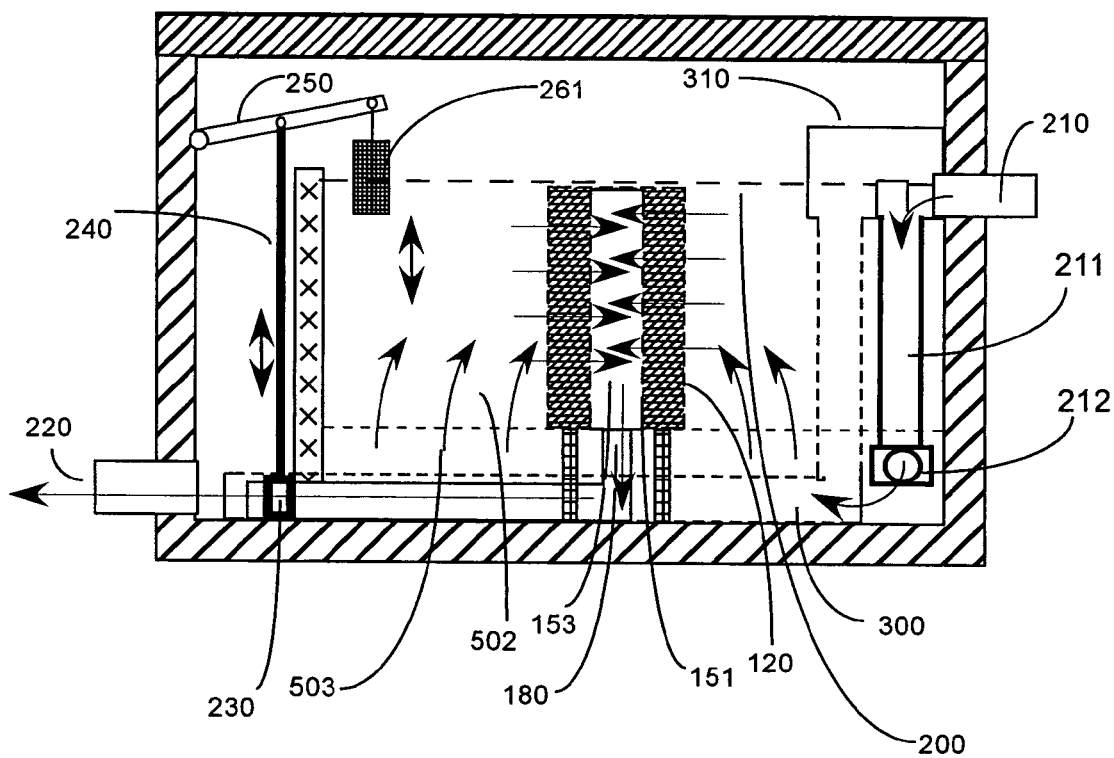
FIG. 8a depicts a cross-sectional view of embodiments of system operating a treatment state.

FIG. 8a depicts an embodiment wherein diverter 310 further comprises treatment conduit 211 for introducing liquid into treatment region 313 in FIG. 1 within or about sedimentation zone 503, through diffuser 212, which directs effluent from treatment conduit 211 in a direction substantially parallel to the chamber floor, to reduce sediment stirring during operation. In some embodiments, diffuser 212 is a "tee" having an inlet and two or more outlets.

In operation, the system depicted in FIG. 8a operates in the following manner. After liquid enters the system through chamber inlet 210, it passes through diverter 310, wherein the liquid in a first non-overflow state flows into diverter 310, and is entirely routed into treatment conduit 211, which terminates inside of treatment region 313 in or about sedimentation zone 503. As the liquid level rises from sedimentation zone 313 into treatment zone 502, the float 261 begins to move upward thus actuating valve 230. Upon actuation, valve 230 opens and liquid will begin to flow through cartridge 120, onward through manifold 130 and through valve 230, ultimately exiting the system through outlet 220. By routing liquid directly into the sedimentation zone, suspended sediments may settle onto the floor of the chamber more quickly than if the liquid were entered into the top of the treatment region 313, thereby further limiting the potential for clogging of the outer wall and media of cartridge 120.

In another embodiment, a valve may be used to control the flow of liquid from the cartridge lumen in relation to the level of liquid inside cartridge lumen 130. An example of this type of valve arrangement is described in U.S. Pat. No. 6,027,639, by Lenhart, et al., and U.S. Pat. No. 5,707,527, by Knutson, et al., both of which are herein incorporated by reference for all purposes, and the specific purposes disclosed therein and herein. The valve system of Lenhart or Knutson may be combined with the valve system of the present invention to further control the level of liquid both inside and outside of the cartridge.

Figure 8B:
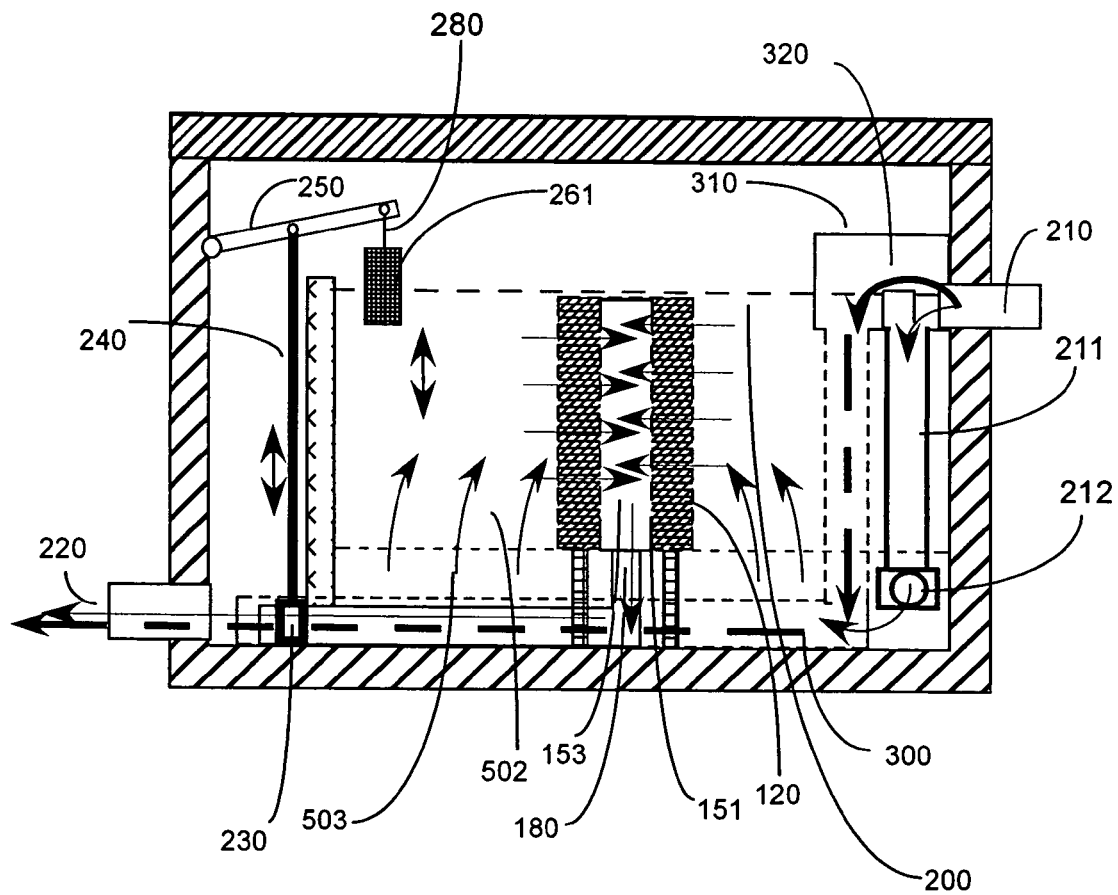
FIG. 8b depicts a cross-sectional view of embodiments of an over-flow diverter operating in an over-flow state.

FIG. 8b depicts the system operating in an over-flow state wherein the liquid flow rate is great enough to cause a portion of the liquid to flow over diverter weir 320 and on through by-pass conduit 300. Both the by-pass routed portion of the liquid and the portion that flowed through the cartridges, "treated" liquid, reunite, in some embodiments, in valve housing 245, prior to flowing outside of the system through chamber outlet 220. In other embodiments, treated and by-pass portions of the liquid may be handled independently outside of the cartridge system.

In some embodiments, valve 230 is not actuated until liquid level 200 is above the top region of cartridge 120 so that substantially all of outer cartridge wall 150 is submerged under liquid before valve 230 is actuated to increase the flow of fluid from cartridge lumen 153 through conduit 230, and ultimately through outlet 210. In some embodiments, a low flow outlet permits fluid to pass through the cartridge system when the flow rate is low, wherein the fluid passes through cartridge 120. In some embodiments, the low flow outlet is achieved by incomplete closure of valve 230, or by liquid path between treatment region 313 and chamber outlet 220.

Over-Flow and Diversion

Another aspect of the invention provides, in certain embodiments, for a diverter for diverting over-flow liquid to a by-pass conduit so as to further regulate the liquid level within the cartridge chamber treatment area. A diverter may be external and upstream to the cartridge chamber, or may be located inside of the cartridge chamber. Locating the diverter inside of the cartridge chamber can reduce the cost of construction because only one hole needs to be dug, for in-ground installations, and because all components can be included in a pre-fabricated "one-piece" structure, or in pieces that may be assembled at the system's installation site.

A diverter acts mainly to prevent flow through the treatment region 313 in excess of the flow that can be passed through the cartridges to prevent overflowing of the treatment region 313 and scouring or scavenging of the settled sediments captured in the treatment region 313 from carrying such sediments further downstream of the system. By diverting overflow around the treatment region 313, the liquid that is to be treated can be treated in a manner which optimizes cartridge capacity, including, maintaining flow through the cartridge in a flow rate range consistent with the optimal flow rate range for the particular cartridge and the media contained therein, as well as optimizing the sedimentation conditions within the treatment region 313 shown in FIG. 1.

As noted above, FIG. 4 depicts a graphical illustration representing characteristics of embodiments of a system where the diverter and the flow valve work together to manage liquid flow through the cartridge chamber. Line A represents the relative depth of liquid in the treatment region 313, line B represents the rate of flow of liquid entering the system, and line C represents the flow rate of over-flow liquid discharging from the system. During the time when line B approaches point (p) on the graph, the control valve is substantially shut to cause inflowing liquid to accumulate in the treatment region 313 as shown by line A, which shows that the depth of water rapidly rises, due to accumulation, then plateaus as the liquid level achieves a desired depth and the valve opens to increase flow of liquid through the cartridges. The beginning of liquid by-pass begins at point (q), where regulation of water flowing into the treatment region 313 begins to be limited by the diverter, as inflowing liquid begins to spill over an over-flow weir that is in communication with a by-pass conduit which transfers liquid from the inlet side of the system, to the outlet side of the system, and may be joined with post-treatment effluent flowing from the cartridges. As system inflow further increases during by-pass, flow through the treatment region 313 remains substantially the same, however, slight increases in liquid level occur as shown by the sloped region of line A captioned (r). Once system inflow exceeds the capacity of by-pass, excess inflowing liquid is routed into the treatment region 313, which, at point (t) establishes a level higher than the valve housing weir, causing a portion of the water from the treatment region 313 to flow directly into the valve housing without first flowing through the cartridge, hence resulting in a second-stage by-pass flow path being formed.

Figure 9A:
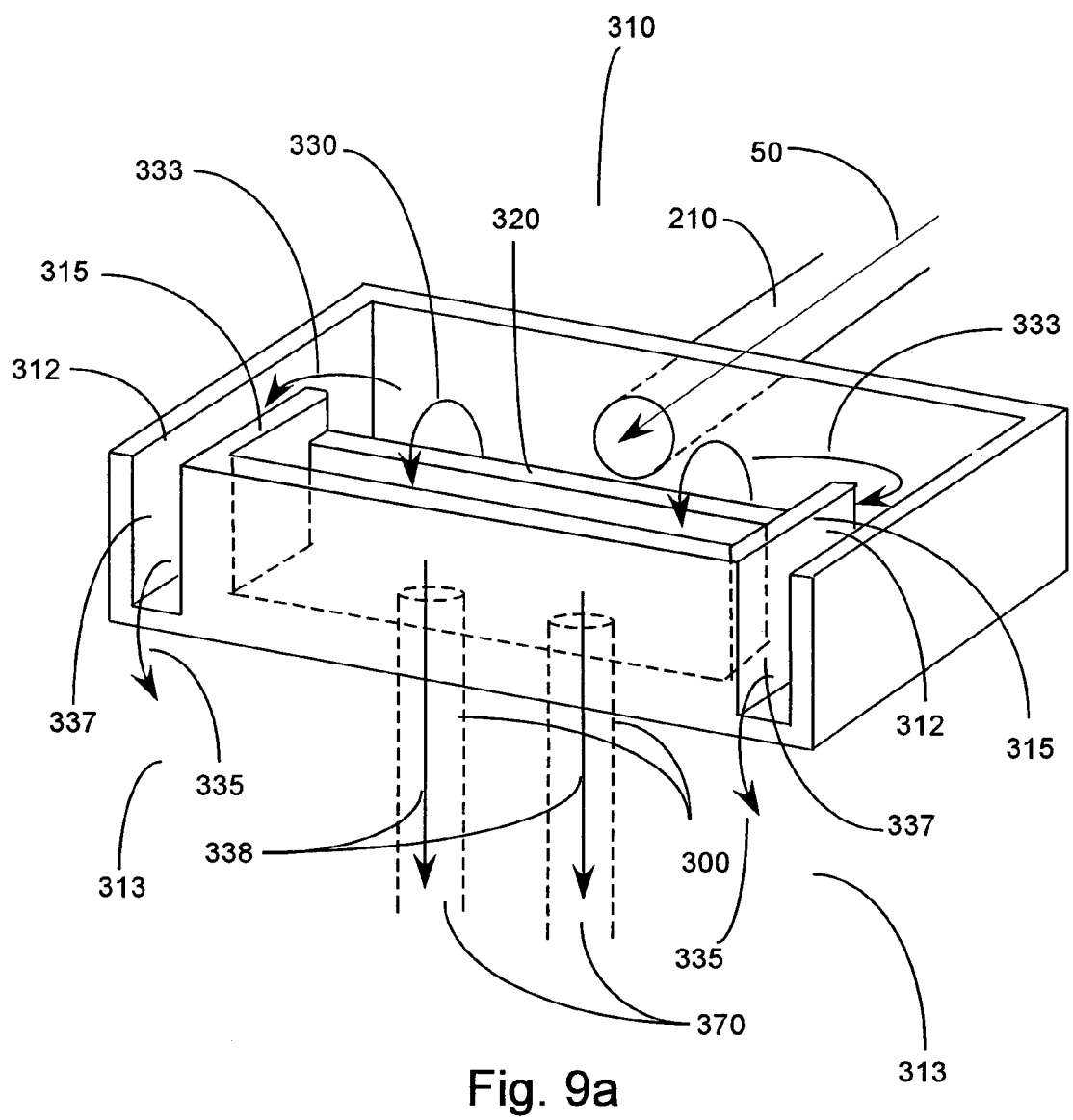
FIG. 9a depicts a perspective-view of embodiments of an over-flow diverter operating in a high-flow state.

FIG. 9a depicts an exemplary diverter 310 in communication with inlet 210 having liquid flow 50 flowing therethrough. As liquid flow 50 flows into diverter 310, it splits into two flow routes 333, routing about over-flow weir walls 315, which are spaced-apart from diverter walls 312 at a distance such that when liquid flow 50 exceeds a certain flow rate, a portion of liquid flow 50, over flow 330, spills over weir wall 320 and flows down through overflow conduits 300, then outside of the cartridge chamber 110. The non-diverted portion of liquid flow 50, treatment flow 335, flows out from diverter outlets 337 into treatment region 313, where it then flows through the cartridges, manifold, valve and chamber outlet.

Figure 9B:
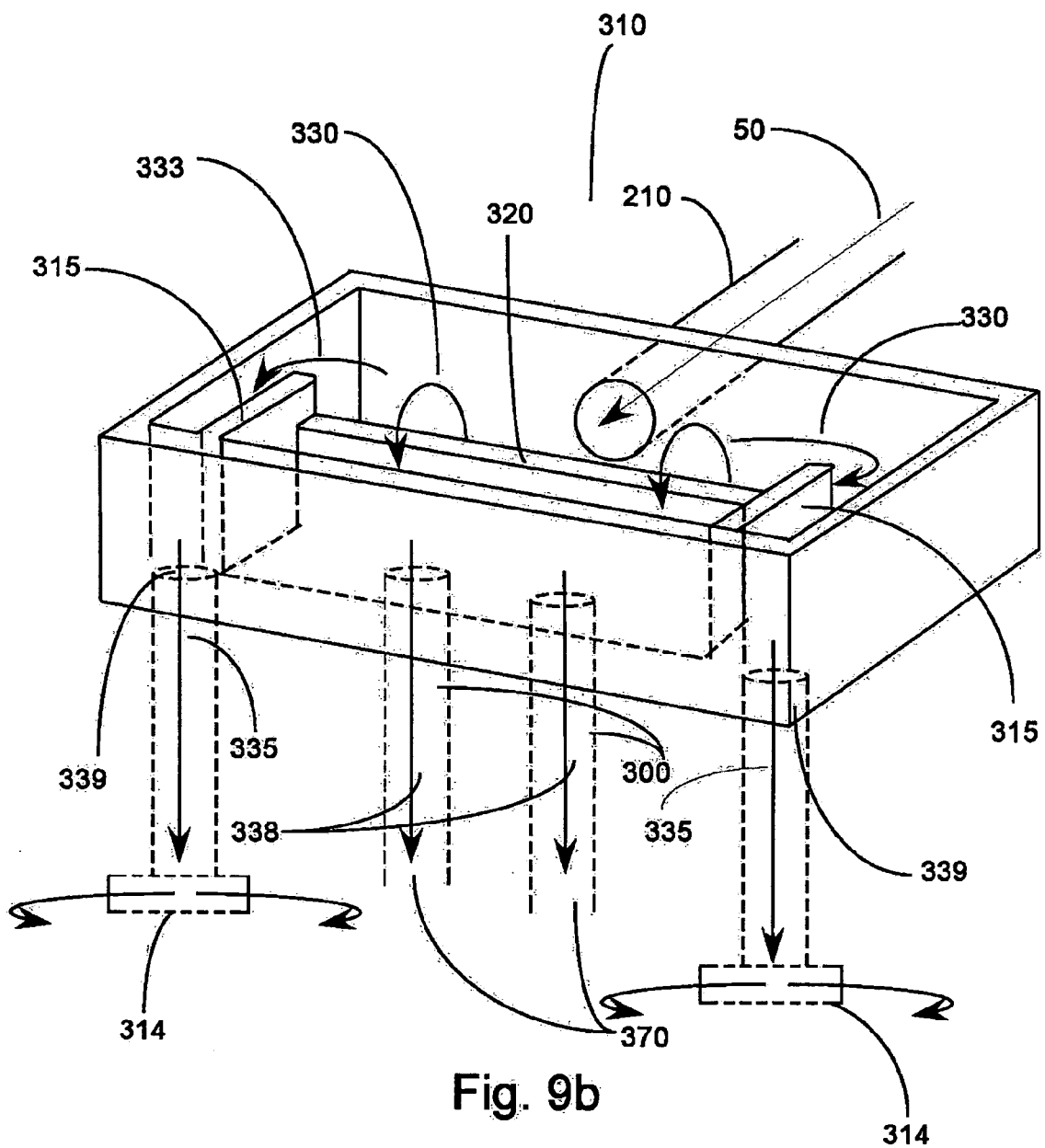
FIG. 9b depicts a perspective-view of embodiments of an over-flow diverter operating in an over-flow state.

FIG. 9b depicts an alternative embodiment, wherein flow routes 330 include routing the liquid into treatment conduits 339, and optionally through a diverter tee 314 into a split flow path 370, which flows outward for distance in a direction substantially parallel to the floor of the cartridge chamber.

Figure 10A:
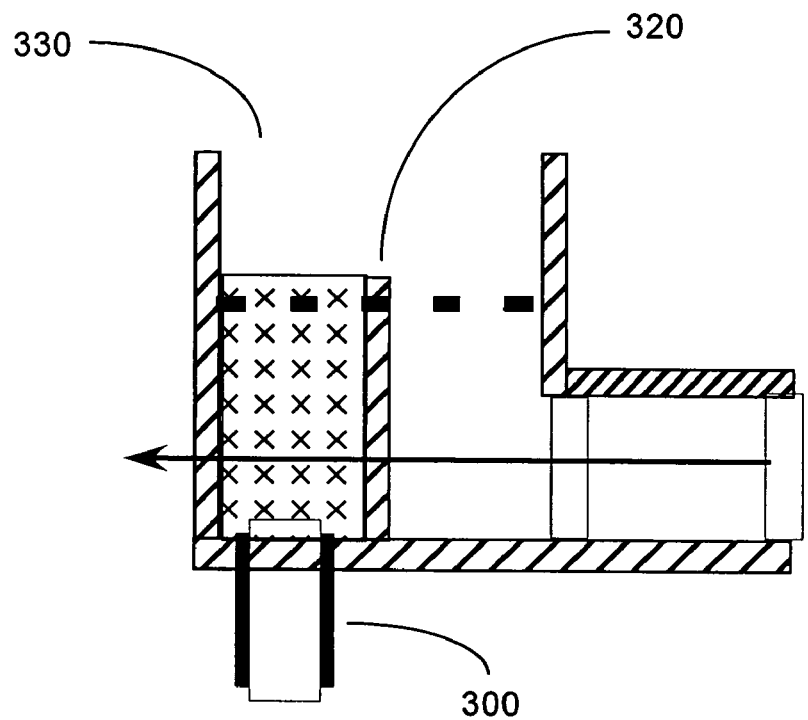
FIGS. 10a and 10b depict a cross-sectional view of embodiments of an over-flow diverter operating in an over-flow state.
Figure 10B:
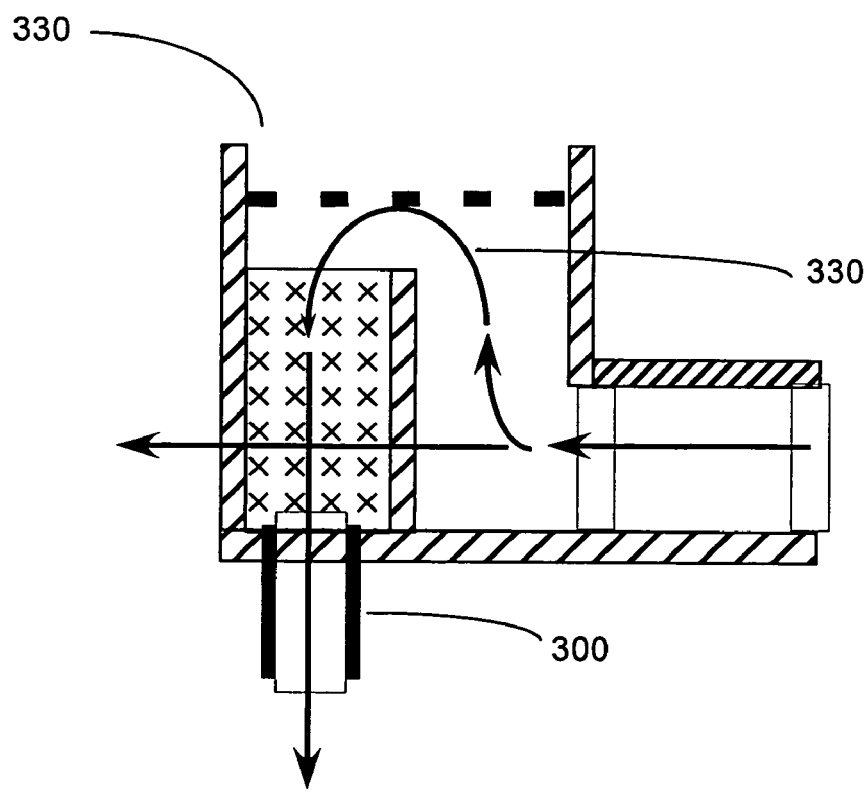

FIGS. 10a and 10b depict a cross-sectional view of diverter 310. In FIG. 10a, the flow of liquid, shown as an arrow, through diverter 310 is at a rate that is below over flow. FIG. 10b depicts in cross-section how a portion of the liquid flow, shown as a bifurcated arrow, flows over diverter weir 320 and downward through over-flow conduit 300.

Figure 11A:
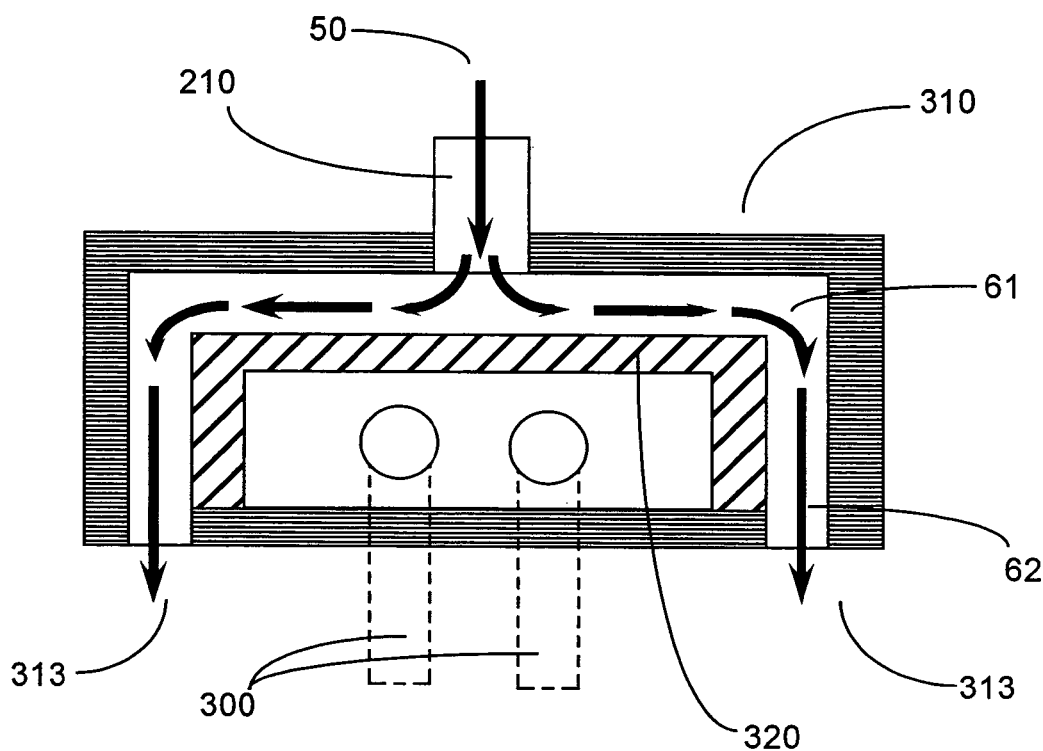
FIGS. 11a and 11b depict a plan-view of a diverter.
Figure 11B:
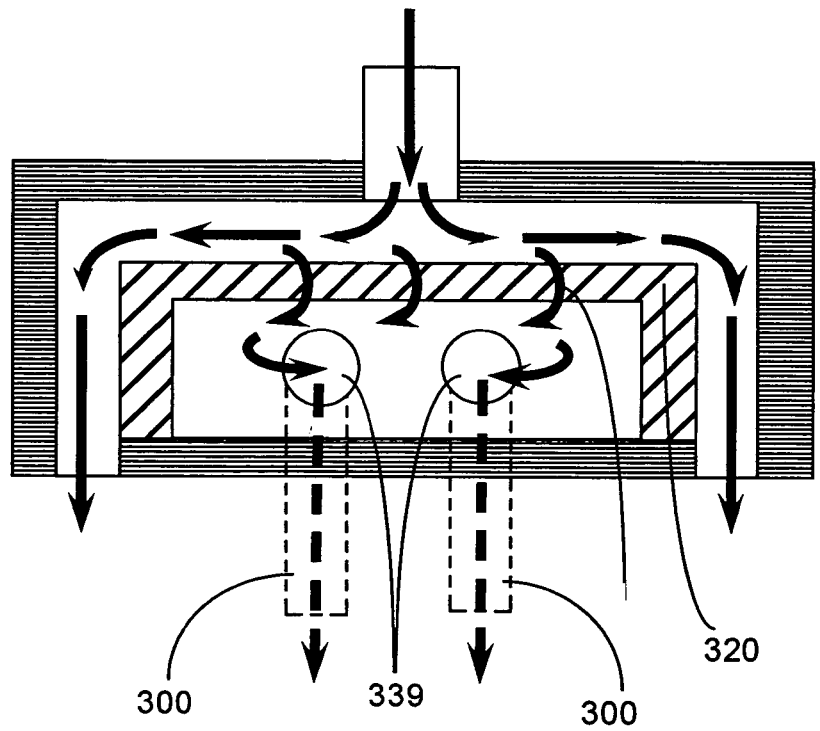

FIG. 11a depicts a plan-view of an exemplary embodiment of a diverter. Inlet 210 routes liquid flow 50 into diverter 310, wherein two flow paths 61 are established and flow towards treatment region 313. FIG. 11b depicts the same plan-view of FIG. 11a, but shows the effect of an increased liquid flow 50 causing a portion of that liquid to spill over diverter weir 320, and flow onward through over-flow conduits 300 thereby causing a portion of liquid flow 50 to by-pass treatment region 313.

Figure 12A:
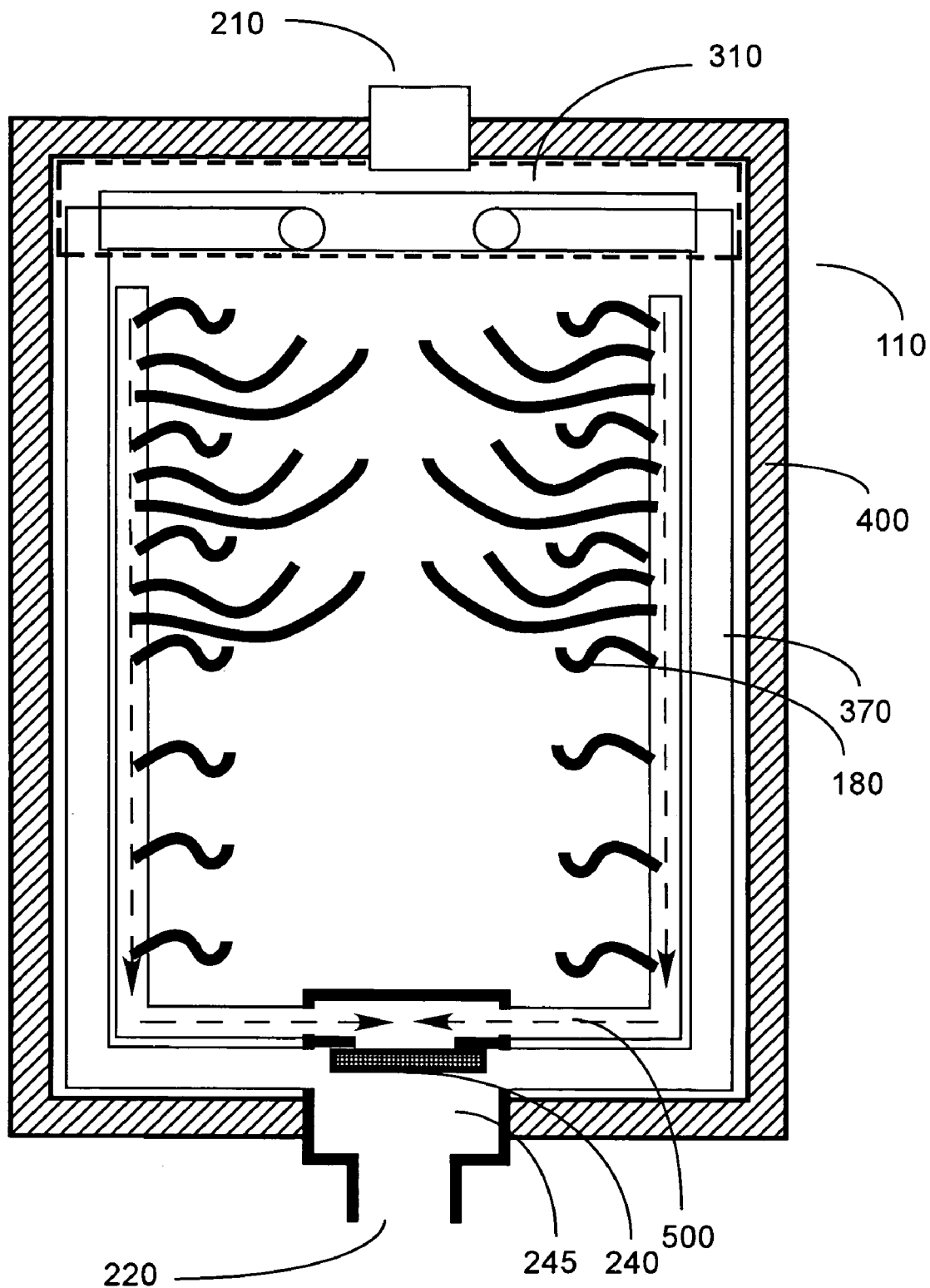
FIGS. 12a through 12c depict a plan-view of a system.
Figure 12B:
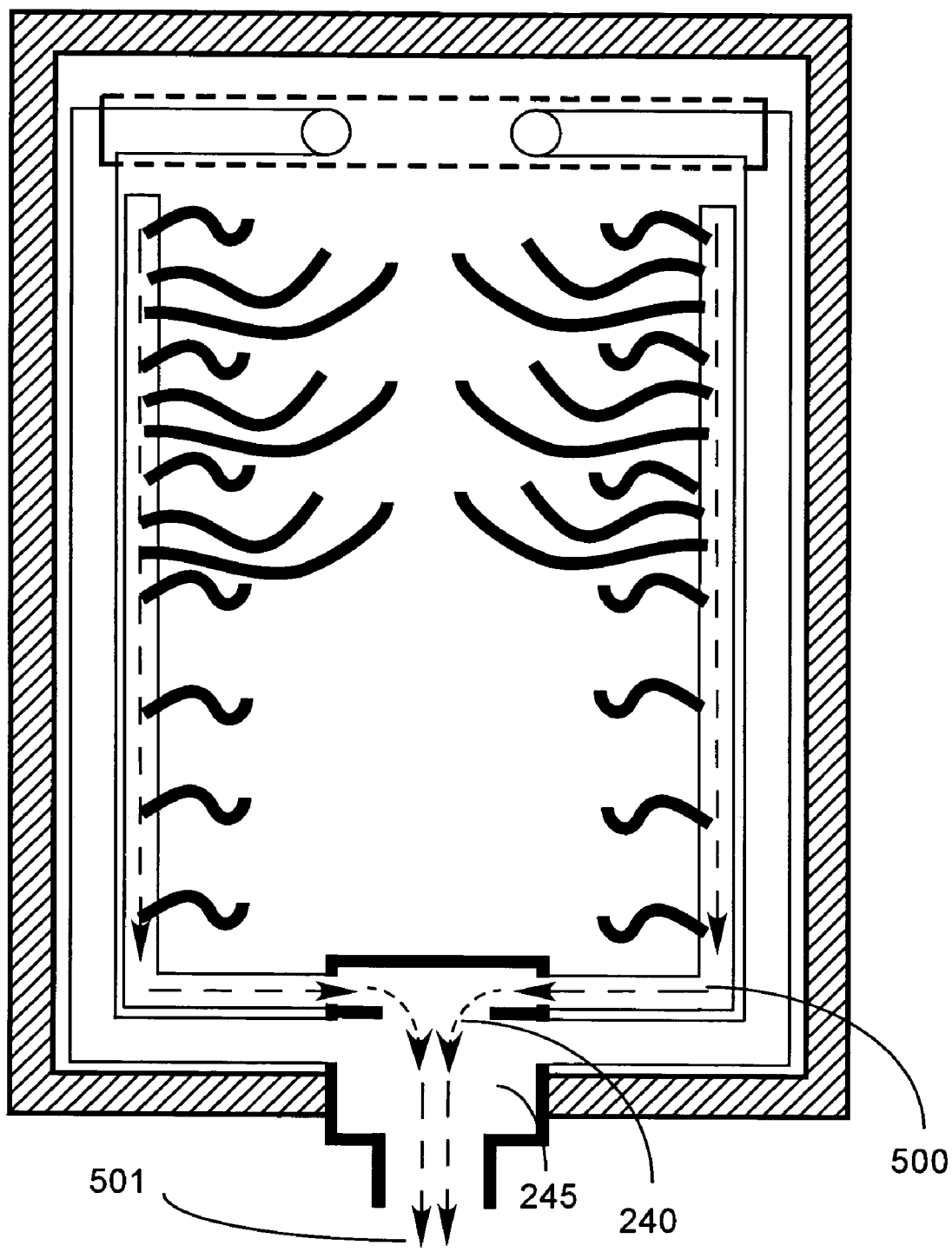
Figure 12C:
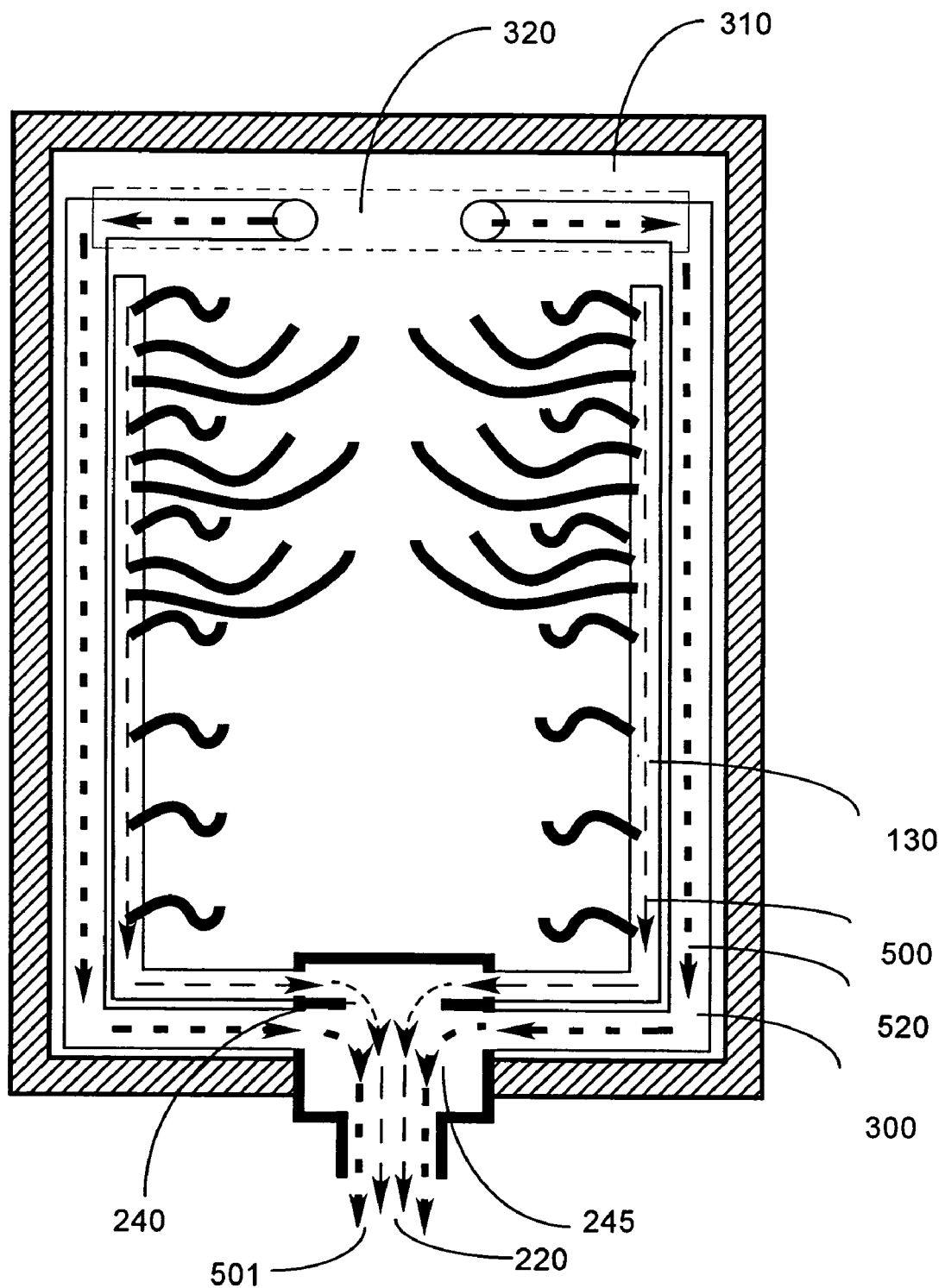

FIGS. 12a through 12c depict a plan-view flow scheme at different flow stages for embodiments according to the invention. FIG. 12a depicts the flow scheme through cartridge chamber 110 of the system when during the accumulation stage. Valve 230 is shut in response to a low liquid level in the treatment region 313, preventing flow of treated liquid flow 500 from manifold 130 from exiting cartridge chamber 110 and causing liquid to accumulate in treatment region 313. In FIG. 12a, the cartridges and support racks have been removed for clarity. Since FIG. 12a is in sub-overflow state, substantially no fluid is present in the bypass conduit 300 or in chamber outlet 220.

FIG. 12b depicts the flow route of the system when it is in treatment stage, wherein treated liquid flow 500 flows through now open valve 230 to pass through valve housing 245 and outlet 220 as effluent 501. The flow rate of effluent 501 varies in accordance to the system inflow rate so as to maintain the liquid level in the treatment region 313 about a selected level (e.g., above the cartridges). Accordingly, during relatively low inflow events, effluent 501 will likewise be relatively low, even though the liquid level within the treatment region 313 is maintained about a selected level, (e.g., above the cartridges).

FIG. 12c depicts the flow route of the system when it is in treatment/overflow stage. As in FIG. 12b, treated liquid flow 500 continues to flow through valve 230, housing 245, and outlet 220 to become effluent 501. Meanwhile, diverter 310 has gone into overflow state and a portion of the inflowing liquid is flowing over diverter weir 320 and flowing through by-pass conduit 300 as non-treated liquid overflow 520, which may be blended with treated liquid flow 500 to form a composite effluent 501 containing treated and non-treated liquid. In other embodiments, treated liquid flow

500 and non-treated liquid overflow 520 are routed to different receiving bodies. A non-limiting example being that the treated liquid flow is routed to a storage reservoir for irrigation, whereas the untreated liquid flow is routed to a natural receiving body.

In some embodiments, a diverter is situated outside of the cartridge chamber, wherein the diverter routes over-flow around the cartridge chamber. In some embodiments, a secondary by-pass conduit may be located inside of the cartridge chamber to increase by-pass flow capacity beyond the flow capacity of the primary by-pass conduit and prevent scouring of the treatment region 313 when the excess capacity is routed through the treatment region 313 because system inflow exceeds over-flow and/or cartridge processing capacity.

Supports and Retainers

Figure 13A:
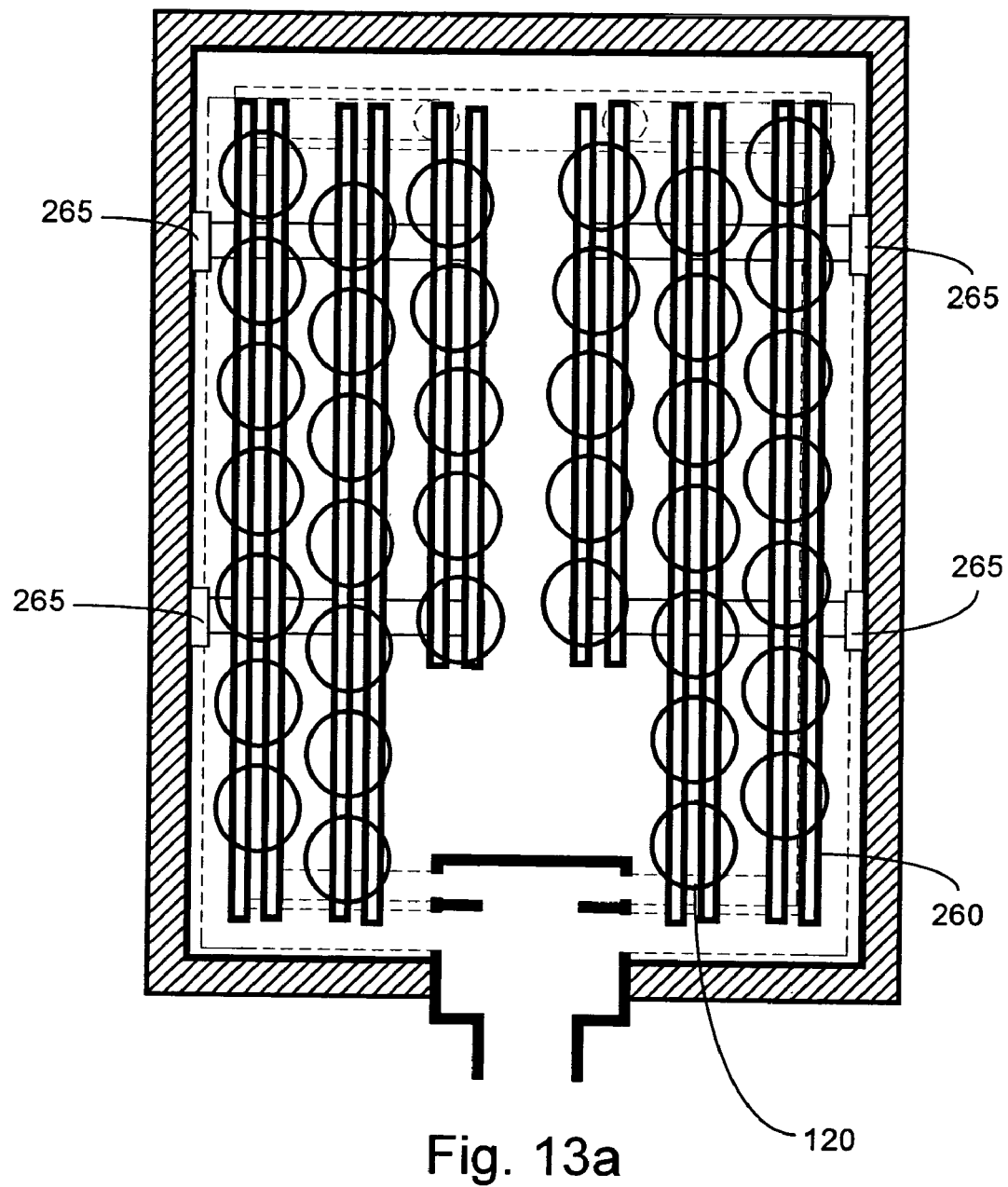
FIGS. 13a through 13c depict a plan-view of a support system.
Figure 13B:
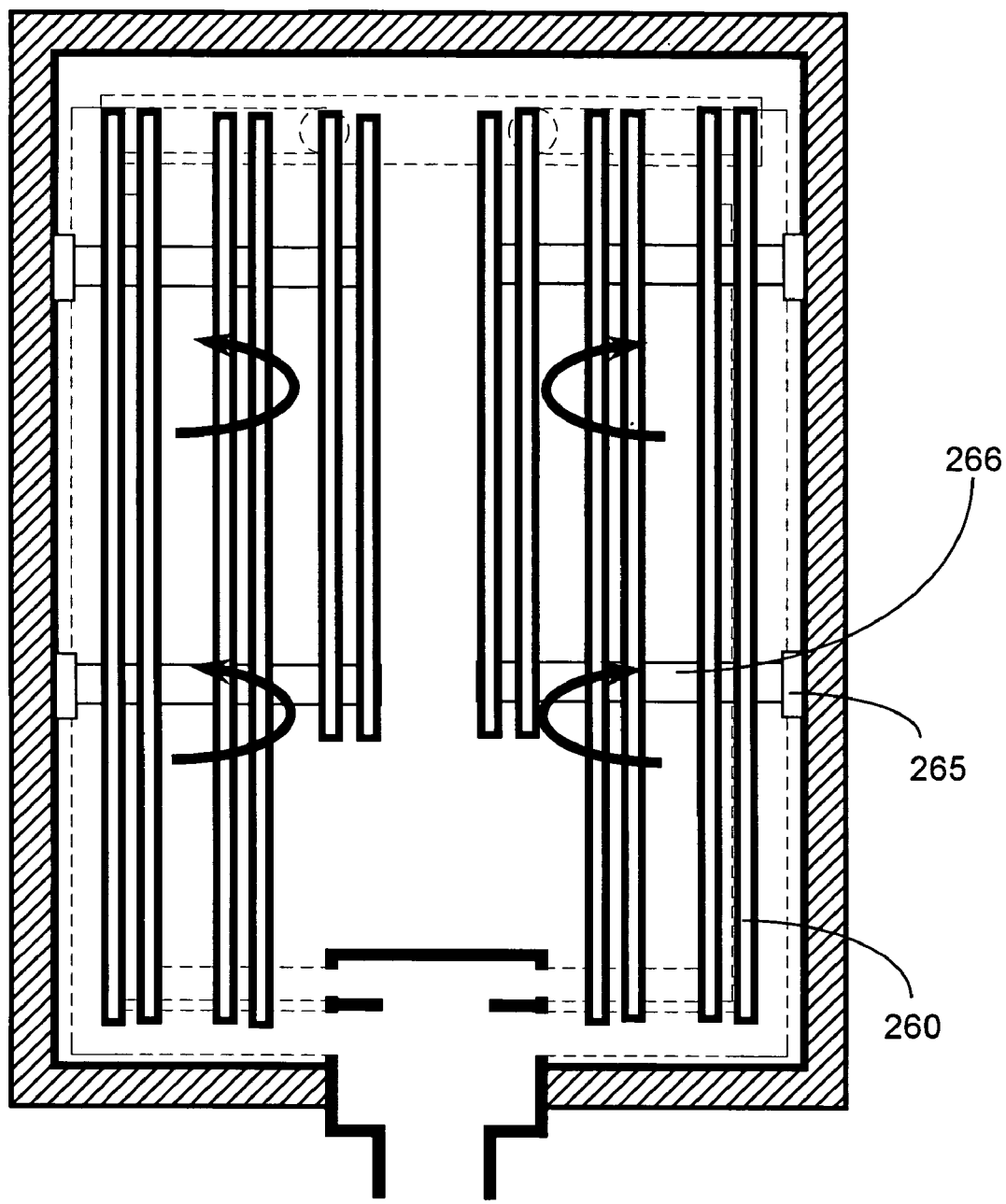
Figure 13C:
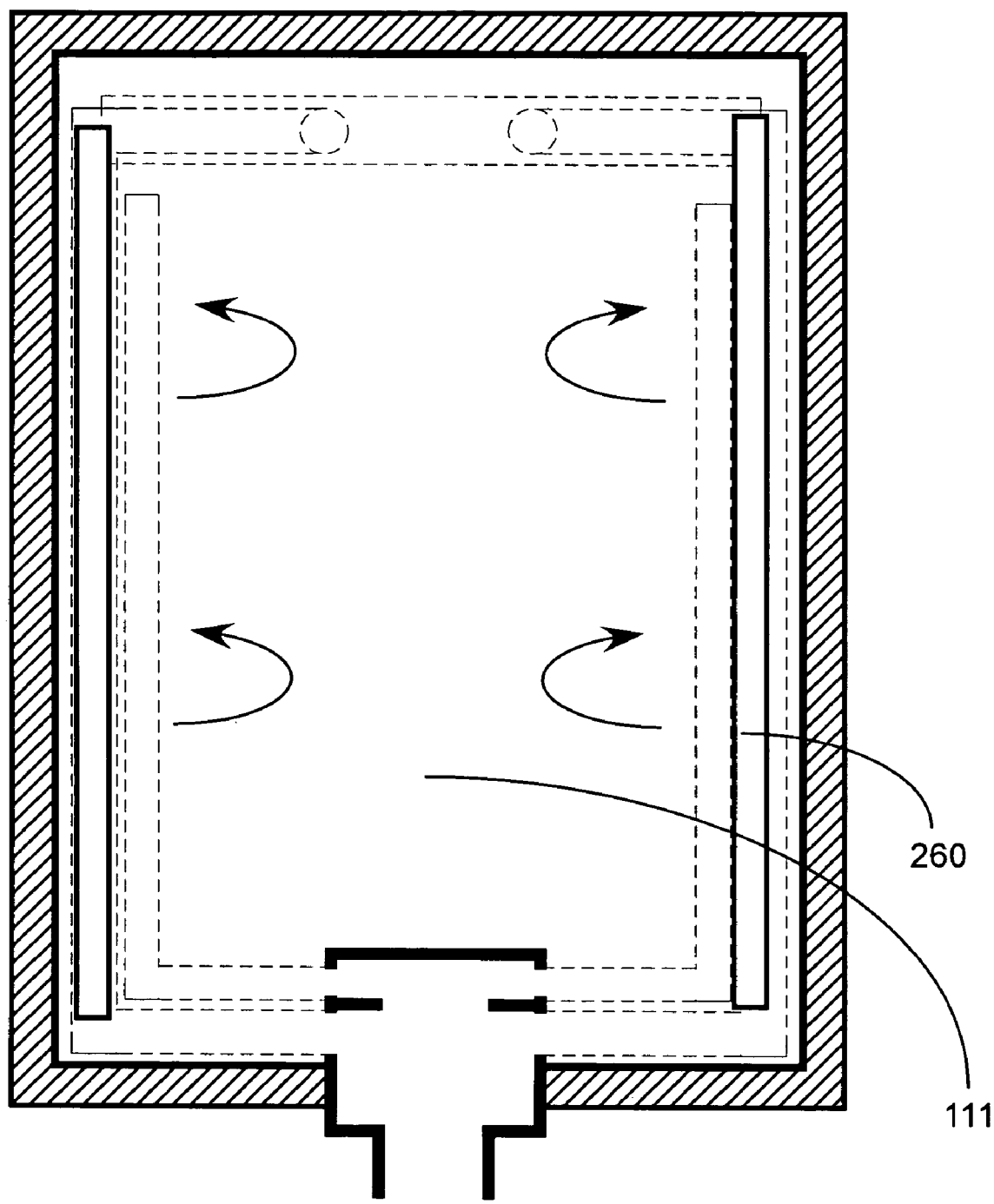

Another aspect of the invention provides for supported cartridges. In some embodiments, the cartridges are elevated above the floor of the cartridge chamber upon supports (e.g., moveable supports) that can be moved about during the operation and/or care of the system, such as the non-limiting example of cleaning, wherein the supports can be moved away from the floor to facilitate removal of the accumulated sediments. In other embodiments, cartridges are retained by overhead retainers that support and maintain the location of each cartridge about a fixed position. In yet other embodiments, the cartridges are supported by a combination of support between the floor of the cartridge chamber and the cartridge and an overhead retainer. Embodiments of a system that includes supports are depicted in FIGS. 13*a* through 13*c*. FIG. 13*a* depicts cartridge chamber 110 having a plurality of cartridges 120 distributed about therein, wherein the cartridges rest upon one or more supports 260, (e.g., rack support).

In some embodiments, support 260 laterally positions cartridges 120 as well as elevates cartridges 120 above the floor of the cartridge chamber. In some embodiments, lateral support is achieved by a two rail support wherein the cartridge outlet or coupling is flanked by each rail support so as to prevent cartridges from skidding off the support in a direction about normal to the run of such rails. Rungs may further be added to prevent cartridge skidding along about the run of such rails. In some embodiments, cartridges can be skidded along the run of the rails of the track, but not to the side of the tracks. A track crossing may be included to provide for selected lateral skidding of the cartridges among two or more tracks to permit "track switching". The supports may be made from materials compatible with the liquid to be treated, including, but not limited to stainless steel, aluminum, brass, plastic, polymers, or any combination of these materials. Tracks may further include skid inlays to provide a bearing surface for track skidding to reduce the effort needed to move cartridges about the cartridge chamber upon the supports. In some embodiments, the supports further include legs, such as collapsible legs that collapse or are otherwise movable when the support is moved about or articulated.

Retainers, which may include a retainer bar, may retain a plurality of cartridges in a row of an array of cartridges. In some embodiments where several rows of cartridges are employed, several retaining bars may be used to retain each row. Several rows are also retainable by a transverse retainer bar that retains each of the retainer bars with respect to each other. Retainer bars may be separable from the cartridges and from other transverse retainer bar. Retaining bars, and in particular, transverse retaining bars, may be attached or attachable to the cartridge chamber, (e.g., to one or more walls of the cartridge chamber) or to a support, if used. Embodiments may also provide for the attachment of retainer bars and/or transverse retainer bars by combinations of bar receiving pockets and retention pins on opposite walls of the cartridge chamber.

FIG. 13*b* depicts the same embodiment of FIG. 13*a*, however, cartridges 120 have been removed, as would be the case during cartridge exchange or floor cleaning procedures. Supports 260 further comprise transverse sub-supports arms 266 that are movably attached to the walls of the cartridge chamber at attachment points 265 (e.g., hinges). FIG. 13*c* depicts the movement of supports 260 away from cartridge chamber floor 111, thus reducing the obstructions present in adjacent the floor area so that accumulated sediments can be removed from the cartridge chamber. Couplings 180, as shown in for example in FIG. 12*a* are not shown in FIGS. 13*a* through 13*c* for clarity.

Figure 14A:
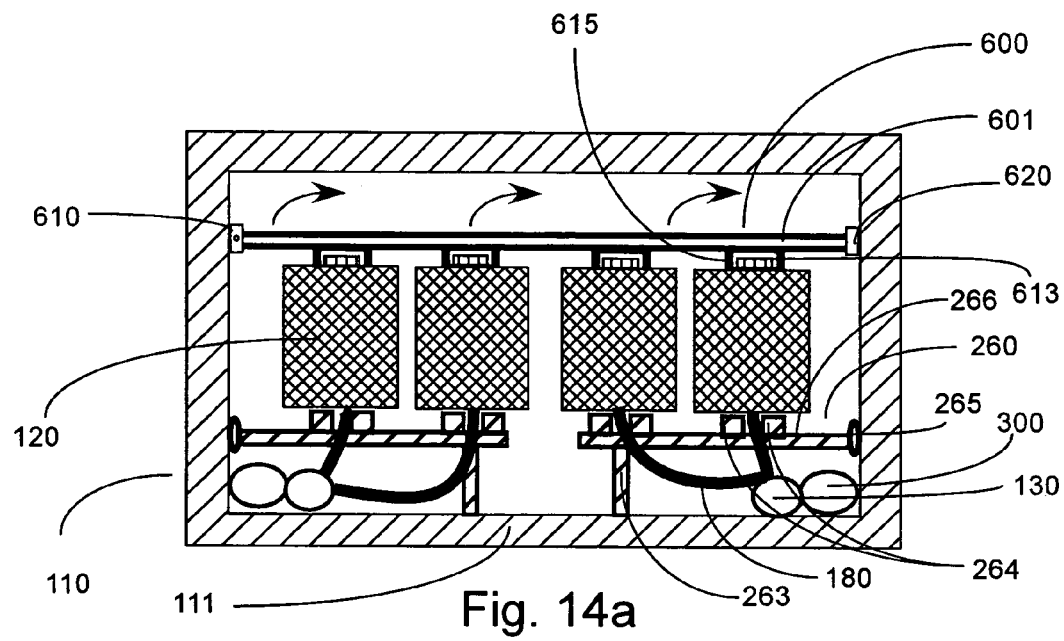
FIGS. 14a and 14b depict a cross-sectional view of use of a retainer support.
Figure 14B:
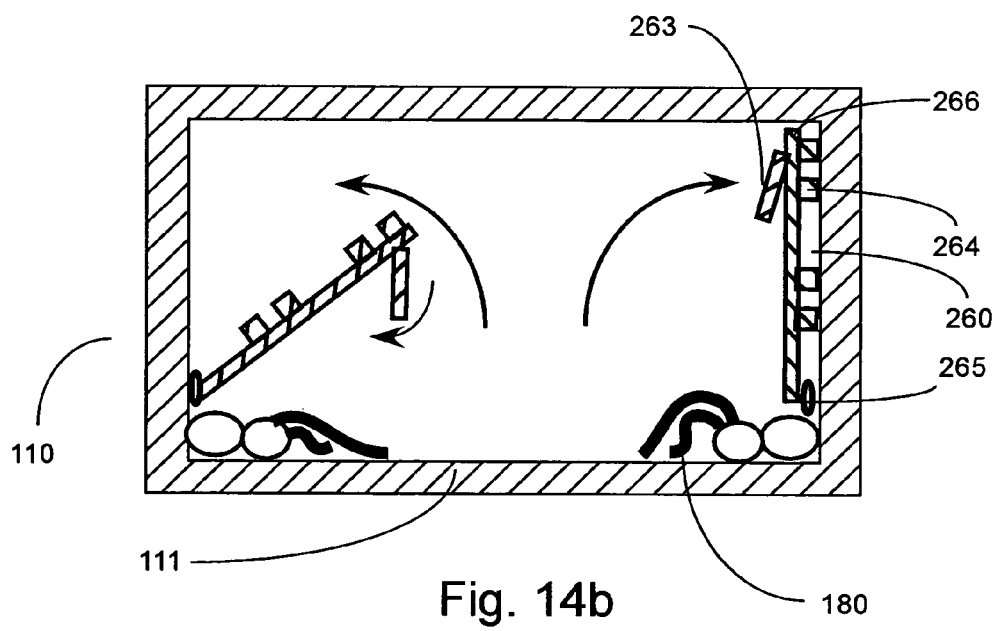

A cross-sectional view of an embodiment having a movable support is depicted in FIGS. 14*a* and 14*b*. FIG. 14*a* shows an intact system where inside of cartridge chamber 110 is housed a plurality of cartridges 120 supported above floor 111 by supports 260. Supports 260 are elevated above floor 111 by legs 263 and wall mount 265 (e.g., a hinged mount). Supports 260 further comprise rails 264 that flank the outlet/coupling of cartridge 120 to laterally stabilize cartridges 120. Cartridges 120 are further retained in position by retainer 600, which may comprise retainer bars 615, wherein the retainer bars 615 may run substantially parallel to rails 264. Retainer bars may be directly attached to cartridge chamber walls, or indirectly attached through transverse retainer bars, or through a combination of both. Cartridges 120 may contact retainer bars 615 through at a retainer contact point (e.g., retainer boss 613). Retainer bars 615 may be further spatially isolated by transverse retainer bars 601 that attach to retainer bars 615 and cartridge chamber 110, such as a wall of cartridge chamber 110, and may be attached through a detachable fastener, for example, but not limited to, pocket receiver 620 and pin retainer/receiver 610. A system may include at least one transverse retainer bar, situated adjacent opposing ends of cartridge chamber 110, running substantially perpendicular to retainer bars 615.

The invention also includes methods for using the system and devices disclosed herein. For example, removal of cartridges 120 from cartridge chamber 110 may be performed as follows. First, retainer pins 610 are removed from their receiver to liberate transverse retainer bar 601. Then, retainer bars 615 are lifted away from retainer bosses 613. With retainer 600 removed, cartridges 120 may be moved about, for example, tilted to reveal access to coupling 180 for detaching coupling 180 from cartridge 120. With coupling 180 now separated from cartridge 120, cartridge 120 may be further moved about, and removed from cartridge chamber 110 through, for example, an access hole located in the top wall of cartridge chamber 110, and, for example, using a hoist located outside of cartridge chamber 110.

In the embodiment shown in FIG. 12*b* where cartridges 120 have been removed, supports 260 may then be moved away from floor 111 by lifting the side of the support distal wall mount/hinge 265, to swing out of the way support 260. In some embodiments a latch retains support 260 against the wall during service. Couplings 180 may remain adjacent floor 111, partially immobilized by surrounding accumulated sediment, if present to sufficient levels. Couplings 180 may then be moved away from floor 111 and temporarily attached to the wall to further expose floor 111 for cleaning. Alternatively, manifold 130 may be removed from cartridge chamber 110 during cleaning and maintenance, and later reinstalled and attached by straps afterwards, thus further exposing floor 111 and allowing for servicing and repair of manifold 130 and couplings 180 outside of cartridge chamber 130. In another embodiment, couplings 180 may be fixedly connected to support 260, so that when support 260 is moved away from floor 111, couplings 180 may be moved and held away from floor 111.

Other Features

Another aspect of the invention provides for error or status reporting devices that change state upon the occurrence of an event. For example, a lever having a float attached thereto, may move and latch in an upward state upon the liquid level inside the cartridge chamber exceeding a certain point, thus indicating that a treatment region 313 overflow state was realized in the past, suggesting that either the system is undersized for treating inflow during peak events and/or that the cartridges may need to be serviced. In yet another example, a comparator for comparing flow rates between different flow routes within the system, such as comparing the flow rates between liquid that flows through cartridges 120 and liquid that flows through the overflow conduit 300. By comparing the relative flow rates between the two routes, a determination can be made as to the current flow capacity of the cartridges, possibly suggesting service is needed when the rate differential exceeds a preset criteria. Still another example provides for a cartridge lumen liquid level indicator for comparing the liquid level inside the lumen of the cartridge with the liquid level outside of the lumen of the cartridge, the differential therein suggesting the amount of head loss between the outside and inside of the cartridge which may be correlative to the degree of plugging that the cartridge or its media is experiencing. In this example, an indicator rod having first and second ends, wherein a first end would pass through the upper end of the cartridge, and the second end would reside in the lumen of the cartridge and has a float attached thereto. In some embodiments, the float would also act to regulate liquid flow through the cartridge, and in others, the float would not act to regulate liquid flow through the cartridge when actuated. Changes in length of the first end of the indicator rod protruding above the cartridge would correlate to the liquid level inside the cartridge.

Cartridges may further include a vent for purging air from inside the cartridge lumen, a check valve for purging air and/or creating a vacuum inside the cartridge lumen. Cartridges may further be open to ambient air via a breather tube that extends above the liquid level inside of the cartridge chamber.

Some embodiments of the invention may further include a sump well or wells located inside the cartridge chamber to further increase the accumulated sediment capacity of the system and to simplify removal of the sediment.

In another aspect of the invention, the system may further include a treatment which included bioremediation, the use of additives such as coagulants and/or flocculants by, for example, self-feeding.

In yet another aspect of the invention, an anti-scouring measure is provided to further prevent scouring of the treatment region 313 during peak flow events. For example, an upstream over-overflow diversion device comprising an upstream valve that shuts off diverter flow to the treatment region 313 when the liquid level in the treatment region 313 exceeds a certain point, for example, a level higher than needed to fully actuate the downstream valve, such as valve 230.

Another aspect of the invention provides for a diverter output regulator which regulates the liquid output of the diverter which flows into the treatment region in relation to the flow rate of the liquid being routed through the over-flow route of the cartridge system. For example, gate valve(s) may be actuated in relation to changes in the rate of flow of liquid flowing in the overflow route of the system.

The disclosure set forth above may encompass one or more distinct inventions, with independent utility. Embodiments, including the specific embodiments thereof as disclosed and illustrated herein, are not intended to be considered in a limiting sense, because numerous variations are possible. The subject matter of the inventions includes all novel and nonobvious combinations and subcombinations of the various elements, features, functions, and/or properties disclosed herein.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

As used herein and in the appended claims, the singular forms "a", "and", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

What is claimed is:

1. A system for removing material from a flowing liquid, the system comprising:
   a housing;
   one or more cartridges disposed in the housing, wherein each cartridge has an outer permeable wall and an inner permeable wall that form a media region between the walls, wherein a media is disposed within at least part of the media region to remove at least a portion of the material from the flowing liquid, said one or more cartridges also having an inner cartridge lumen in fluid communication with said inner permeable wall, and a cartridge outlet in fluid communication with the inner cartridge lumen;
   a cartridge chamber disposed in the housing having a treatment region that houses the one or more cartridges, wherein the cartridge chamber is bounded by a chamber floor and an end wall that defines a sediment capture region, and wherein the cartridge chamber also includes a chamber inlet to accept the flowing liquid, a chamber outlet that passes through the end wall to discharge treated liquid, and a conduit positioned above the floor that extends from the one or more cartridges to the outlet; and a support elevated above the floor of the cartridge chamber by legs and an hinged mount attached to a side wall of the chamber to laterally stabilize the one or more cartridges in the chamber, wherein at least a portion of sediment coming into the chamber through the inlet is deposited in the sediment capture region, and wherein said support may be swung to a position permitting cleaning of sediment from the floor.

2. The system of claim 1, wherein the conduit comprises a manifold in fluid communication with the cartridge outlet.

3. The system of claim 2, comprising a coupling to connect the cartridge outlet to the manifold.

4. The system of claim 3, wherein at least a portion of the coupling is made from a flexible material.

5. The system of claim 3, wherein the one or more cartridges are press-fit attached to the coupling or the manifold.

6. The system of claim 3, wherein the one or more cartridges are attached to the coupling or the manifold using a non-threaded coupling.

7. The system of claim 1, wherein the media is disposed within all of the media region.

8. The system of claim 1, wherein the media is selected from the group consisting of compost, vermiculite, activated carbon, zeolite, perlite, ion exchange media, peat, and sand.

9. The system of claim 1, wherein the one or more cartridges further comprise a retainer connection boss, and wherein the system further comprises a retainer for retaining the one or more cartridges in or about a selected position within the cartridge chamber.

10. The system of claim 1, wherein the flowing liquid comprises water.

11. The system of claim 10, wherein the flowing liquid comprises storm water.

12. The system of claim 1, wherein the flowing liquid comprises water, and the material comprises a material component selected from the group consisting of sediment, fine suspended solids, algae, plant material, animal waste, pollutants, oil, agricultural by-products, herbicides, pesticides, trash, debris, leaves, heavy metals, copper, phosphates, and phosphorous.

13. A system for removing material from a flowing liquid, the system comprising:

a housing;

one or more cartridges disposed in the housing, wherein each cartridge has an outer permeable wall and an inner permeable wall that form a media region between the walls, wherein a media is disposed within at least part of the media region to remove at least a portion of the material from the flowing liquid, said cartridge also having an inner cartridge lumen in fluid communication with said inner permeable wall, and a cartridge outlet in fluid communication with the inner cartridge lumen;

a cartridge chamber disposed in the housing and containing the one or more cartridges, wherein the cartridge chamber is bounded by a chamber floor and an end wall that defines a sediment capture region, and wherein the cartridge chamber also includes a chamber inlet and a chamber outlet that passes through the end wall, and wherein a conduit provides fluid communication between the chamber outlet and the cartridge outlet, and the conduit is positioned above the floor; and a support elevated above the floor of the cartridge chamber by legs and an hinged mount attached to a side wall of the chamber to laterally stabilize the one or more cartridges in the chamber, wherein at least a portion of sediment coming into the chamber through the inlet is deposited in the sediment capture region, and wherein said support may be swung to a position permitting cleaning of sediment from the floor; and an actuatable valve-wherein the valve controls a flow rate of the flowing liquid within the system by actuating in response to a change in a level of the liquid in the cartridge chamber.

14. The system of claim 13, wherein the one or more cartridges are press-fit attached to the conduit.

15. The system of claim 13, wherein the one or more cartridges are wholly or partly retained by a non-threaded coupling.

16. The system of claim 13, wherein the one or more cartridges are wholly or partly retained by a retainer.

17. The system of claim 16, wherein the retainer comprises a retaining bar that contacts the one or more cartridges at a retaining boss distally positioned from the cartridge outlet.

18. The system of claim 13, wherein the media is selected from the group consisting of compost, vermiculite, activated carbon, zeolite, perlite, ion exchange media, peat, and sand.

19. The system of claim 13, wherein the one or more cartridges are a plurality of cartridges, and wherein the conduit comprises a manifold in fluid communication with each of said plurality of cartridges and the chamber outlet.

20. The system of claim 13, wherein the one or more cartridges further comprise a retainer boss, and said system further comprises a retaining bar to retain the one or more cartridges in or about a selected position within the cartridge chamber.

21. The system of claim 13, wherein said valve is in fluid communication with the cartridge outlet and the chamber outlet.

22. The system of claim 13, wherein said valve is actuated to increase a flow of said liquid through said valve as said level of said liquid increases within said cartridge chamber.

23. The system of claim 22, wherein said level of said liquid is maintained about a selected level within said cartridge chamber.

24. The system of claim 13, wherein the conduit comprises a manifold and the one or more cartridges is a plurality of cartridges in fluid communication with a manifold, wherein the manifold is also in fluid communication with the valve.

25. The system of claim 13, wherein the valve is a gate valve.

26. The system of claim 13, wherein the valve is a variable rate valve.

* * * * *